US011775610B2

(12) United States Patent
V et al.

(10) Patent No.: US 11,775,610 B2
(45) Date of Patent: Oct. 3, 2023

(54) FLEXIBLE IMPUTATION OF MISSING DATA

(71) Applicant: SAP SE, Walldorf (DE)

(72) Inventors: Chethan Babu V, Bangalore (IN); Swarnendu Kundu, Bankura (IN)

(73) Assignee: SAP SE, Walldorf (DE)

( * ) Notice: Subject to any disclaimer, the term of this patent is extended or adjusted under 35 U.S.C. 154(b) by 484 days.

(21) Appl. No.: 16/712,777

(22) Filed: Dec. 12, 2019

(65) Prior Publication Data
US 2021/0182602 A1 Jun. 17, 2021

(51) Int. Cl.
G06F 17/18 (2006.01)
G06N 3/08 (2023.01)
G06N 20/10 (2019.01)
G06F 18/231 (2023.01)
G06F 18/22 (2023.01)
G06F 18/211 (2023.01)
G06F 18/21 (2023.01)

(52) U.S. Cl.
CPC .......... G06F 17/18 (2013.01); G06F 18/211 (2023.01); G06F 18/2163 (2023.01); G06F 18/22 (2023.01); G06F 18/231 (2023.01); G06N 3/08 (2013.01); G06N 20/10 (2019.01)

(58) Field of Classification Search
CPC .... G06F 17/18; G06K 9/6215; G06K 9/6219; G06K 9/6228; G06K 9/6259; G06K 9/6261; G06K 9/6271; G06K 9/6298; G06N 20/00; G06N 20/10; G06N 3/08; G06N 5/027
See application file for complete search history.

(56) References Cited

U.S. PATENT DOCUMENTS

| 9,349,105 | B2 | 5/2016 | Beymer et al. | |
| 9,390,142 | B2 | 7/2016 | Panda et al. | |
| 10,387,419 | B2 | 8/2019 | Li et al. | |
| 2014/0207493 | A1 | 7/2014 | Sarrafzadeh et al. | |
| 2017/0147930 | A1* | 5/2017 | Bellala | G06N 5/04 |
| 2018/0081914 | A1* | 3/2018 | Zoll | G06K 9/6256 |
| 2018/0270312 | A1 | 9/2018 | Shah et al. | |

FOREIGN PATENT DOCUMENTS

WO    WO 2019134873    7/2019

OTHER PUBLICATIONS

Zhang et al: "Clustering-based Missing Value Imputation for Data Preprocessing", IEEE, 2006 (Year: 2006).*
Zhao et al: "HICCUP: Hierarchical Clustering Based Value Imputation using Heterogeneous Gene Expression Microarray Datasets", IEEE, 2007 (Year: 2007).*

(Continued)

Primary Examiner — Ruiping Li
(74) Attorney, Agent, or Firm — Klarquist Sparkman, LLP

(57) ABSTRACT

Imputation of missing data can be provided for both normalized and non-normalized data. Data can be partitioned, and data complete records used to impute values for data missing records. Hierarchical clustering can be used to cluster the data. Imputation can rely on a closed record in a same cluster. Record similarity can be used to adjust an observed value, and an estimated mean can also be incorporated. Useful for augmenting datasets that can be applied to analytics, machine learning, and other scenarios.

20 Claims, 25 Drawing Sheets

(56) References Cited

OTHER PUBLICATIONS

Purwar et al: "Hybrid prediction model with missing value imputation for medical data", 2015 (Year: 2015).*

Kundu et al., "A Hybrid Model for Missing Data Imputation," *Int'l Journal of Innovative Computer Science and Engineering*, vol. 4, Issue 3, May-Jun. 2017, pp. 110-116, 7 pages.

"Imputation," *Wikipedia*, visited Sep. 23, 2019, 6 pages.

"Random Forest," *Wikipedia*, visited Sep. 24, 2019, 10 pages.

"Hierarchical Clustering," *Wikipedia*, visited Sep. 24, 2019, 7 pages.

"Cosine Similarity," *Wikipedia*, visited Sep. 24, 2019, 6 pages.

Singhal, "Modern Information Retrieval: A Brief Overview". *Bulletin of the IEEE Computer Society Technical Committee on Data Engineering*, 24 (4): 35-43, 2001, 9 pages.

"Feature Selection," *Wikipedia*, visited Sep. 24, 2019, 16 pages.

Peng et al., "Feature selection based on mutual information: criteria of maxdependency, max-relevance, and min-redundancy," *IEEE Transactions on Pattern Analysis and Machine Intelligence*, vol. 27, No. 8, pp. 1226-1238, 2005, 13 pages.

Stekhoven et al., "MissForest—non-parametric missing value imputation for mixed-type data," *Bioinformatics*, vol. 29, No. 1, pp. 112-118, 2012, 7 pages.

Stekhoven, "Package 'missForest,'" Comprehensive R Archive Network, github.com/stekhoven/missForest, Aug. 29, 2016, 10 pages.

Azur et al., "Multiple Imputation by Chained Equations: What it is and how does it work?" NIH Public Access Author Manuscript, ncbi.nlm.nih.gov, nihms267760.pdf, Mar. 1, 2012, 14 pages.

Gelman et al., "Missing-data imputation," Chapter 25, pp. 529-544, Data Analysis Using Regression and Multilevel/Hierarchical Models, Cambridge University Press, 2007, 16 pages.

Schmitt et al., "A Comparison of Six Methods for Missing Data Imputation," Journal of Biometrics & Biostatistics, vol. 6, Issue 1, 2015, 6 pages.

Grace-Martin, "Seven Ways to Make up Data: Common Methods to Imputing Missing Data," The Analysis Factor, retrieved from: https://www.theanalysisfactor.com/seven-ways-to-make-up-data-common-methods-to-imputing-missing-data/, 7 pages, [visited Oct. 2, 2019].

Badr, "6 Different Ways to Compensate for Missing Values In a Dataset (Data Imputation with examples)," Towards Data Science, Jan. 4, 2019, 16 pages.

"Truncated Mean," *Wikipedia*, en.wikipedia.org, visited Nov. 30, 2019, 4 pages.

Pradipta Maji and Sushmita Paul, Rough Set-Based Feature Selection: Criteria of Max-Dependency, MaxRelevance, and Max-Significance, https://link.springer.com/chapter/10.1007/978-3-642-30341-8_1, 26 pages.

Muellner, D. (1984). Modem hierarchical, agglomerative clustering algorithms, (1973), 1-29.

Sarwar, B., Karypis, G., Konstan, J., Riedl, Item-Based Collaborative Filtering Recommendation, May 2001, 11 pages.

Zhu, X., Su, S., Fu, M., Liu, J., Zhu, L., Yang, W., "A Cosine Similarity Algorithm Method for Fast and Accurate Monitoring of Dynamic Droplet Generation Processes." Scientific Reports, https://doi.org/10.1038/s41598-018-28270-8, Jul. 2, 2018, 14 pages.

Krislock, N. et al., "Euclidean Distance Matrices and Applications," Sep. 26, 2011, 38 pages.

Groothuis-Oudshoorn et al., Package "mice" https://doi.org/10.18637/jss.v45.i03m, Jul. 10, 2019, 168 pages.

Honaker, A. J., King, G., Blackwell, M., Blackwell, M. M., "Amelia II: A Program for Missing Data," Journal of Statistical Software, Dec. 2011, 47 pages.

Stekhoven, Package "missForest," https://doi.org/10.1093/bioinformatics/btr597, Aug. 29, 2016, 10 pages.

Harrell, Package "Hmisc," Nov. 7, 2019, 429 pages.

Hill et al., Package "mi," Apr. 16, 2015, 47 pages.

Li et al., "Assigning missing attribute values based on rough sets theory," 2006 IEEE International Conference on Granular Computing. IEEE, 2006, 4 pages.

Rana, S., John, A. H., Robust Regression Imputation for Analyzing Missing Data, 2012 International Conference on Statistics in Science, Business, and Engineering (ICSSBE), Sep. 2012, 4 pages.

Little, "A Test of Missing Completely at Random for Multivariate Data with Missing Values," Journal of the American Statistical Association, Dec. 1998, pp. 1198-1202, 6 pages.

Lipsitz et al., "A Weighted Estimating Equation for Missing Covariate Data with Properties Similar to Maximum Likelihood," Journal of the American Statistical Association, 1999, 37-41, 15 pages.

Susanti, S. P., "Imputation of Missing Value Using Dynamic Bayesian Network for Multivariate Time Series Data," 2017, 5 pages.

Li, H., Missing Values Imputation Hypothesis: An Experimental Evaluation, 2009, 275-280, 6 pages.

Kundu et al., "A Comparative Study of MissForest and Rough Set Theory for Imputation of Missing Data," International Journal of Advanced Research in Science, Engineering and Technology, 5(7), 6350-6357, Jul. 2018, 8 pages.

T. Chai, and R. R. Draxler, "Root mean square error (RMSE) or mean absolute error (MAE)?—Arguments against avoiding RMSE in the literature," Geosci. Model Dev., 7, 1247-1250, 2014, 4 pages.

* cited by examiner

FLEXIBLE IMPUTATION OF MISSING DATA

FIELD

The field generally relates to data analytics and data science, and specifically to item imputation for missing values.

BACKGROUND

Missing and noisy data are great challenges for the data scientist. Such missing or noisy data pose a significant stumbling block to the construction of predictive models. Statistical analysis methods such as listwise deletion can be used in pre-processing of a dataset. However, such an approach has a great disadvantage in that important or informative information tends to be lost. Classical methods such as mean, median, and the like can be used to avoid such information loss. Further, data scientists have introduced approaches such as imputation using multivariant imputation by chained equation (MICE), missing value imputation using random forest (missForest), and the like, but they are not suitable for many use cases.

There thus remains a need for improved imputation of missing data.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a computer-implemented method comprises receiving a data missing record with a plurality of fields, wherein the data missing record is missing a value for a missing field out of the fields; identifying a closest record to the data missing record, wherein the closest record is a member of a hierarchical cluster out of a plurality of hierarchical clusters; determining a mean estimate for the missing field based on records in the hierarchical cluster; determining a record similarity between the data missing record and the closest record; and imputing a value for the missing field of the data missing record, wherein the imputing comprises adjusting an observed value for the missing field of the closest record based on the record similarity.

In another embodiment, A computing system comprises one or more processors; memory storing a dataset; wherein the memory is configured to cause the one or more processors to perform operations comprising: receiving a data missing record with a plurality of fields out of the dataset, wherein the data missing record is missing a value for a missing field out of the fields; identifying, in the dataset, a closest record to the data missing record, wherein the closest record is a member of a hierarchical cluster out of a plurality of hierarchical clusters; determining a mean estimate for the missing field based on records in the hierarchical cluster; determining a record similarity between the data missing record and the closest record; imputing a value for the missing field of the data missing record, wherein the imputing comprises adjusting an observed value for the missing field of the closest record based on the record similarity.

In another embodiment, one or more non-transitory computer-readable media comprising computer-executable instructions that, when executed, cause a computing system to perform a method comprising receiving a dataset with at least one data missing record; partitioning the dataset into data missing records and data complete records; selecting fields of the dataset for clustering; partitioning the data complete records into a plurality of hierarchical clusters via hierarchical clustering with the selected fields; receiving a data missing record out of the data missing records, wherein the data missing record comprises a plurality of fields and the data missing record is missing a value for a missing field out of the fields; identifying, out of the data complete record, a closest record to the data missing record, wherein the closest record is a member of a particular hierarchical cluster of the hierarchical clusters; determining a mean estimate for the missing field based on records in the particular hierarchical cluster; determining a record similarity between the data missing record and the closest record; imputing a value for the missing field of the data missing record, wherein the imputing comprises adjusting an observed value for the missing field of the closest record based on the record similarity; adding the data missing record with the imputed value to a training dataset; training a neural network with the training dataset; and making a prediction with the trained neural network.

The foregoing and other objects, features, and advantages will become more apparent from the following detailed description, which proceeds with reference to the accompanying figures.

DETAILED DESCRIPTION

Example 1—Overview

Data mining is a major field in computer science for discovering patterns and extracting information from a dataset. In the Knowledge Discovery in Databases (KDD) process, data pre-processing, data selection, data transformation, model and inference, and visualization can be used to extract information. Data cleaning is a part of data pre-processing in which noisy and inconsistent data are removed or imputed. Imputation of noisy data and missing or inconsistent data can be performed as described herein.

Missing data can be classified into three categories: (i) missing at random (MAR), not missing at random (NMAR) and missing completed at random (MCAR). In MAR, data that is missing is not related to the missing data; somehow it is related too some of the observed data. In NMAR, missing data directly or indirectly depend on the value of some other variable in the data set. In MCAR, the missing data is order less. Such missing values have the lowest possibility or no possibility of finding patterns. In reality, MCAR is the most prevalent type of missing data.

Traditional data imputation techniques suffer from a variety of disadvantages. Although various techniques have been developed, they continue to fall short of needs. The imputation technologies described can address such needs. The described flexible imputation technologies can be applied to variety of scenarios, including both normalized and non-normalized data.

The described technologies can incorporate techniques appropriate in a machine learning context such as hierarchical clustering, maximum relevance, cosine-similarity, and Euclidean distance.

As established by experimentation, the described technologies can be superior to existing techniques.

The described technologies thus offer considerable improvements over conventional missing data imputation techniques.

Example 2—Example System Implementing Flexible Imputation of Missing Data

Figure 1:
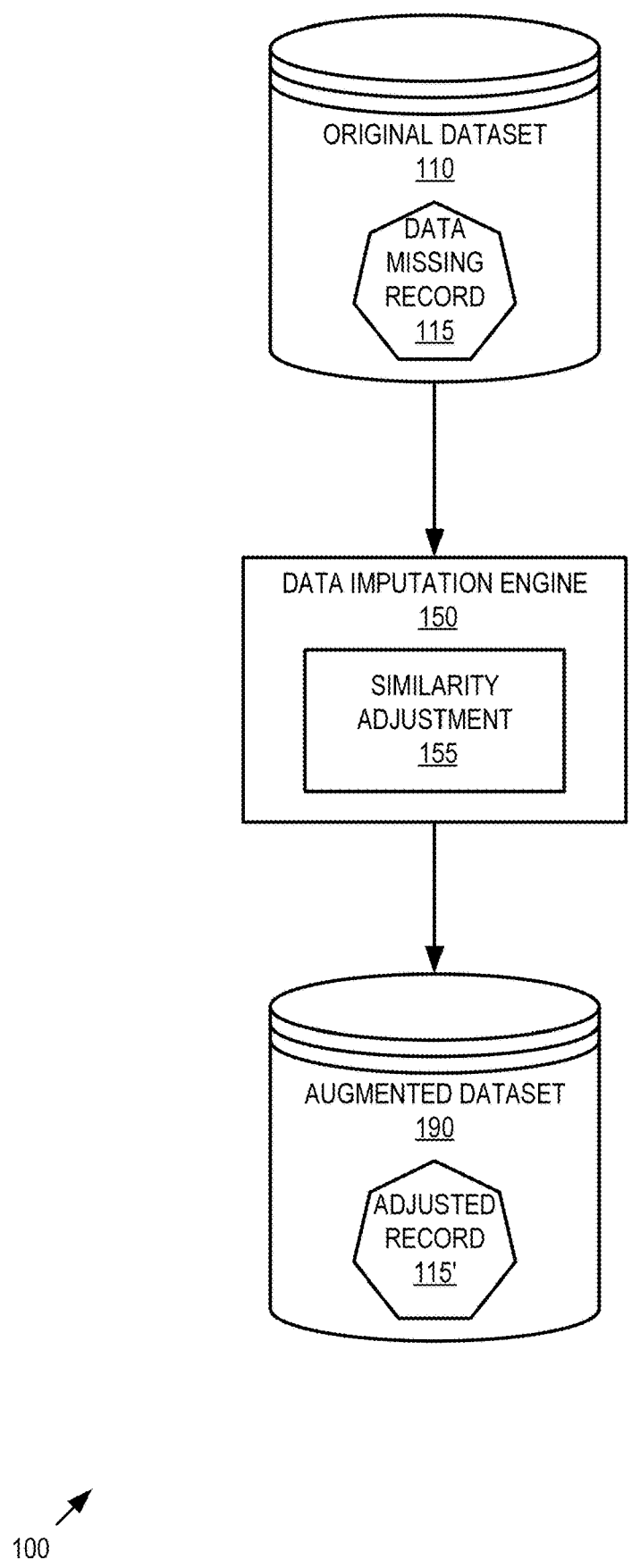
FIG. 1 is a block diagram of an example overall system implementing flexible imputation of missing data.

FIG. 1 is a block diagram of an example system 100 implementing flexible imputation of missing data. In the example, the system 100 can include a data imputation engine 150 that receives an original dataset 110 and generates an augmented dataset 190 that includes an adjusted record 115', which is based on a data missing record 115 of the original data set 110.

As shown, the data imputation engine 150 can include a similarity adjustment 155 as described herein.

The adjusted record 115' can include an imputed value for a missing value from a field of the data missing record 115. Thus, the adjusted record 115' is now more complete (e.g., has values for more fields than originally had) and can be grouped with complete records for analysis, machine learning, modeling, or the like.

In practice, the systems shown herein, such as system 100, can vary in complexity, with additional functionality, more complex components, and the like. For example, there can be additional functionality within the data imputation engine 150. Additional components can be included to implement security, redundancy, load balancing, report design, and the like.

The described computing systems can be networked via wired or wireless network connections, including the Internet. Alternatively, systems can be connected through an intranet connection (e.g., in a corporate environment, government environment, or the like).

The system 100 and any of the other systems described herein can be implemented in conjunction with any of the hardware components described herein, such as the computing systems described below (e.g., processing units, memory, and the like). In any of the examples herein, the datasets, data records, record similarity, estimated means, clusters, imputed values, and the like can be stored in one or more computer-readable storage media or computer-readable storage devices. The technologies described herein can be generic to the specifics of operating systems or hardware and can be applied in any variety of environments to take advantage of the described features.

Example 3—Example Method Implementing Flexible Imputation of Missing Data

Figure 2:
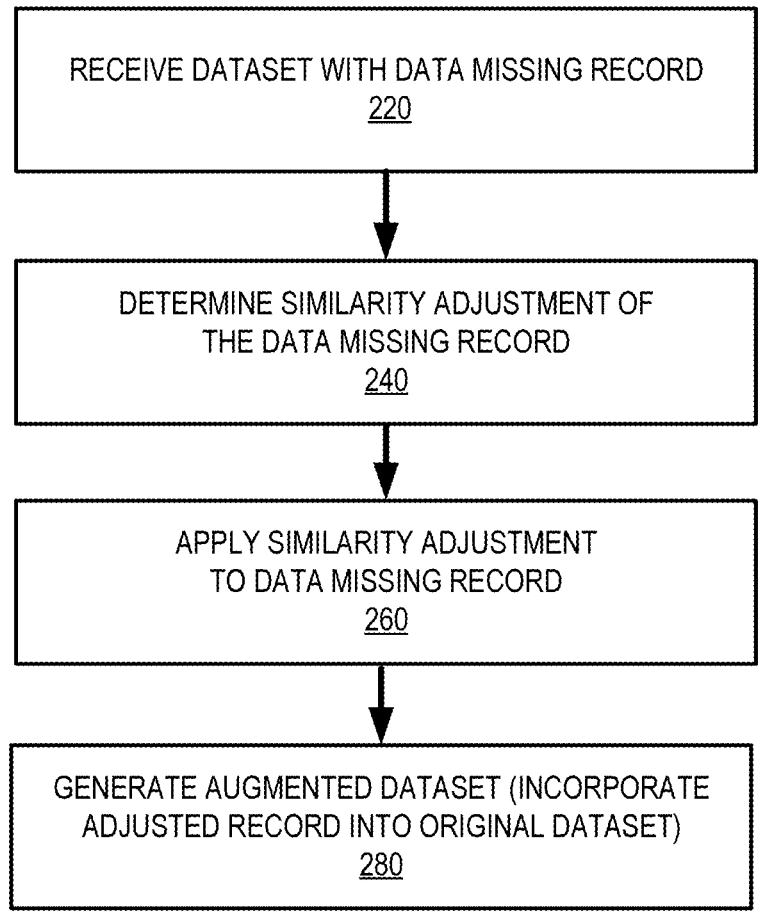
FIG. 2 is a flowchart of an example overall method of flexible imputation of missing data.

FIG. 2 is a flowchart of an example method 200 of flexible imputation of missing data and can be performed, for example, by the system of FIG. 1 (e.g., the data imputation engine). The automated nature of the method 200 allows rapid imputation across a digital dataset.

At 220, a dataset with at least one data missing record is received.

At 240, a similarity adjustment of the data missing record is determined. Such a similarity adjustment can be determined via similarity between the data missing record and a similar data complete record.

At 260, the similarity adjustment is applied to the data missing record. For example, a value for a missing field of the data missing record is determined (e.g., the imputed value) and added to the data missing record, thereby completing the data missing record.

At 280, an augmented dataset is generated. The adjusted record is incorporated into the original dataset, which now has more data complete records due to the addition of the adjusted data missing record.

In practice, the process can be repeated a plurality of times (e.g., for the number of data missing records in the original dataset).

The method 200 can incorporate any of the methods or acts by systems described herein to achieve flexible imputation of missing data.

The method 200 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

The illustrated actions can be described from alternative perspectives while still implementing the technologies.

Example 4—Example Records

In any of the examples herein, a data record (or "record") can take the form of a plurality of values (e.g., a vector) for respective fields (e.g., features). Such values can be of a variety of forms, but are typically converted to scalar values for imputation purposes. In practice, records can be assigned an identifier (e.g., unique within the dataset) so that reference to the record can be made.

As described herein, data in the records may or may not be normalized.

In practice, data is missing for some records (e.g., a field has a missing value). However, such records may be important or otherwise influence downstream processing (e.g., analytics, machine learning, modeling or the like). Therefore, it is desirable to somehow impute a value for the missing value as described herein.

Example 5—Example Data Missing Records

In any of the examples herein, a data missing record can take the form of a record for which at least one of the fields has a missing value (e.g., a value for the field is missing). A value for the field can be imputed via the technologies described herein. The record is then adjusted (e.g., completed) and can be included in the dataset for downstream processing.

Example 6—Example Data Complete Records

In any of the examples herein, a data complete record can take the form of a record for which more fields are present than those in a particular data missing record. In practice, some fields may be missing from both. Thus, the data complete record need not have a value for every field, but is more complete than a particular data missing record. In practice, some fields can be removed or ignored during imputation and/or downstream processing.

Example 7—Example Flexible Imputation Implementation System

Figure 3:
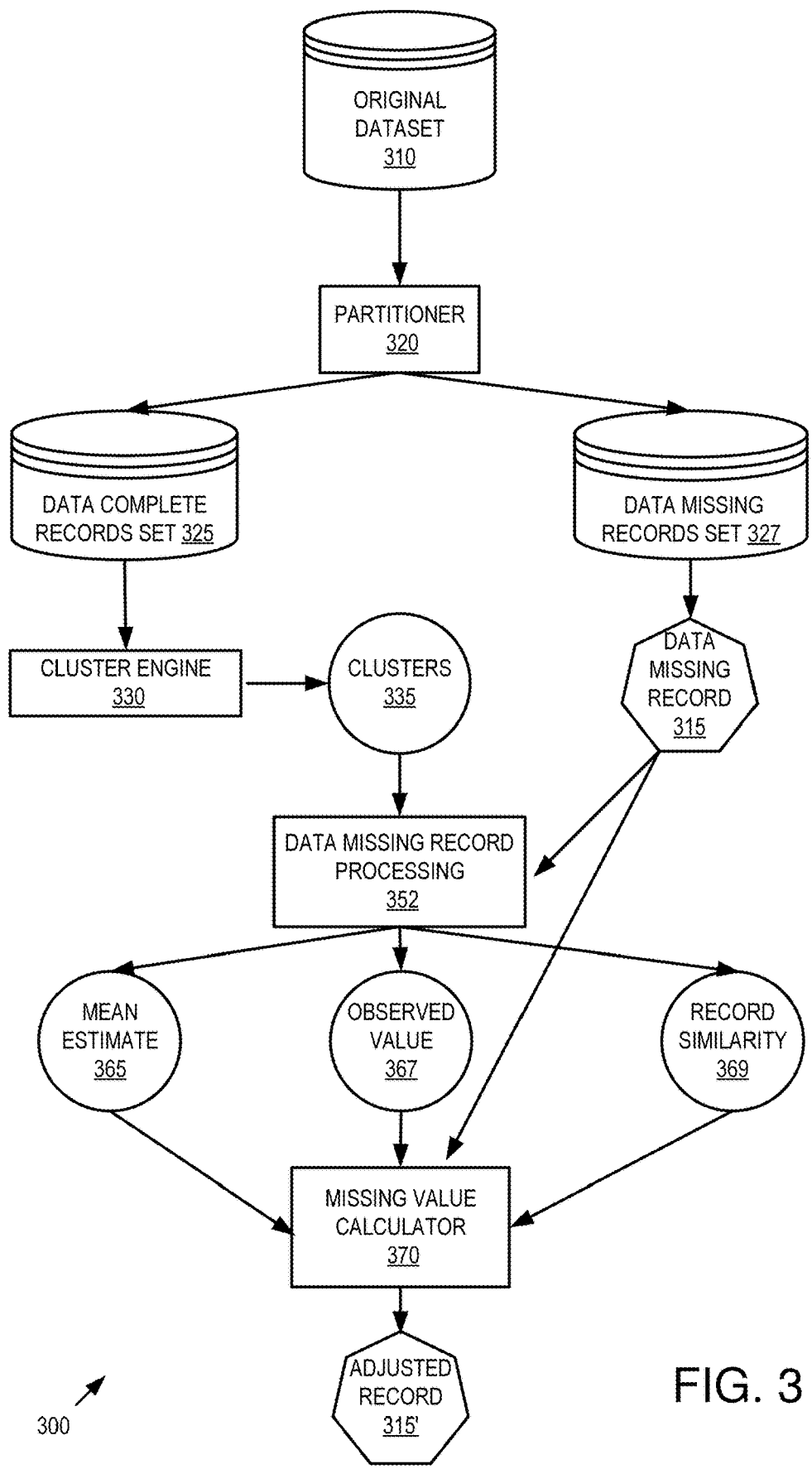
FIG. 3 is a block diagram of an example system implementing flexible imputation of missing data.

FIG. 3 is a block diagram of an example system 300 implementing flexible imputation of missing data that can be used in any of the examples herein.

For an original dataset 310, a partitioner 320 divides records into data complete records 325 and data missing records 327.

A cluster engine 330 applies hierarchical clustering to the records to generate clusters 335. Clustering can also include the data missing records set 327 to facilitate determining cluster membership for the data missing record 315.

A particular data missing record 315 is processed by processing 352, which generates a mean estimate 365, an observed value 367 (e.g., of a closest record to the data missing record 315 as described herein), and record similarity 369 (e.g., which is used for similarity adjustment as described herein).

A missing value calculator 370 accepts the mean estimate 365, the observed value 367, the data missing record 315, and the record similarity 369 to generate an adjusted record 315'. For example, the adjusted record 315 can be the data missing record 315 to which a determined value for a missing value of a field is added (e.g., imputed).

In practice, the processing can be repeated for a plurality of data missing records 315 of the data missing records set 327, resulting in a plurality of adjusted records 315', which are added to the original dataset 310. In practice, the addition of the value can be done in situ (e.g., the value is simply added to the record where it resides in the original dataset 310).

Example 8—Example Flexible Imputation Implementation Method

Figure 4:
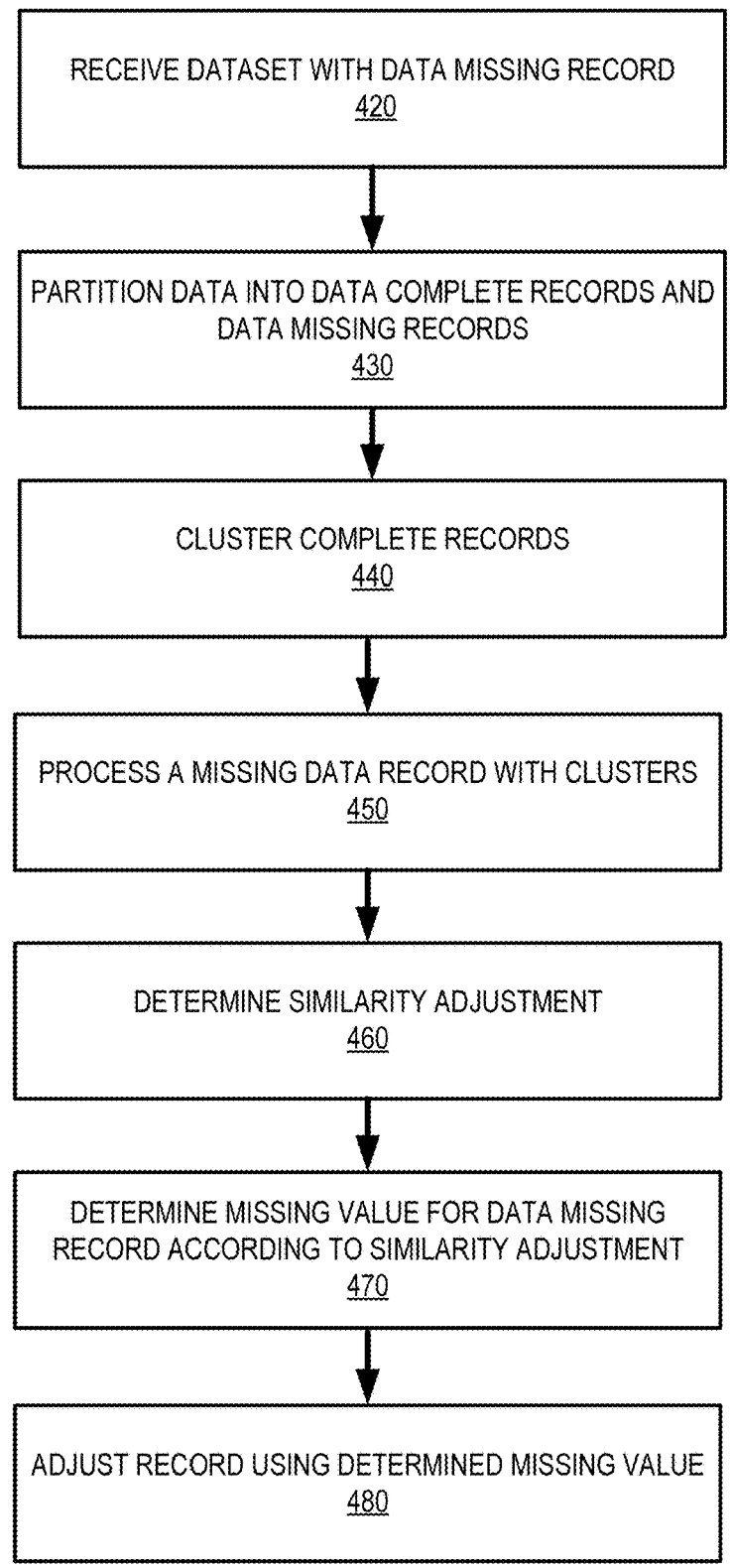
FIG. 4 is a flowchart of an example method of implementing flexible imputation of missing data.

FIG. 4 is a is a flowchart of an example method 400 of implementing flexible imputation of missing data that can be used in any of the examples herein. The method 400 can be implemented, for example, by the system of FIG. 3.

At 420, a data set with one or more data missing records is received.

At 430, the dataset can be partitioned into data complete records and data missing records.

At 440, the complete records are clustered using hierarchical clustering. In practice, the data missing records can also be clustered to facilitate determining cluster membership for the data missing records. Hierarchical clustering can be performed by selecting features (e.g., fields) for clustering. Such features can be specified manually or determined automatically as described herein.

At 450, a missing data record is processed with the clusters, and more particularly with the cluster of which it is a member.

At 460 a similarity adjustment is determined. Such a similarity adjustment can be determined based on a similarity score (e.g., a similarity between the data missing record and the closest record in the cluster of the data missing record).

At 470, a missing value for the data missing record is determined according to the similarity adjustment.

At 480, the missing data record is adjusted using the determined missing (e.g., imputed) value. In other words, the missing value is supplied for the field from which a value was missing.

The adjusted record can then be included in the dataset, resulting in an augmented dataset.

In practice, the method 400 can be repeated for a plurality of data missing records (e.g., one at a time, serially, or in parallel).

Example 9—Example Lower Level Flexible Imputation Implementation Method

Figure 5:
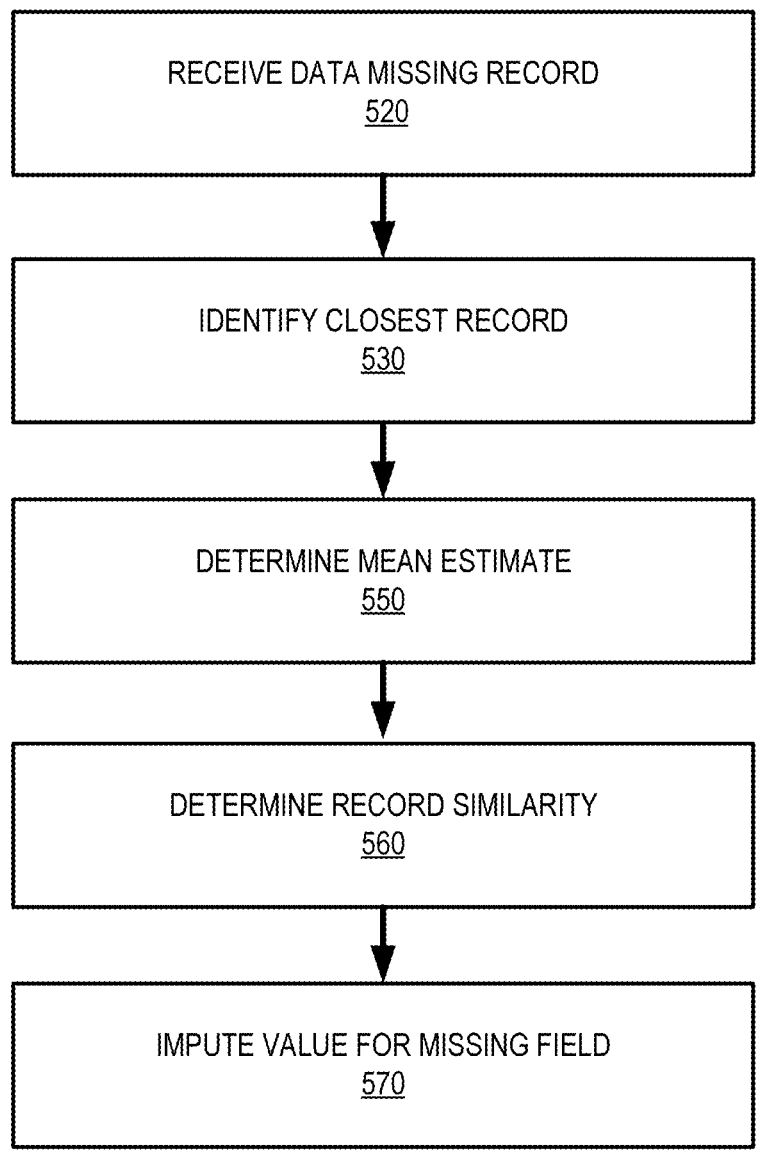
FIG. 5 is a flowchart of a lower level method of implementing flexible imputation of missing data.
Figure 5:

FIG. 5 is a flowchart of a lower level method 500 of implementing flexible imputation of missing data that can be used in any of the examples herein. The method 500 can be implemented, for example, by the system of FIG. 3. Additional acts can be included to complete the overall method (e.g., partitioning, augmenting the dataset, and the like).

At 520, the method receives a data missing record with a plurality of fields, wherein the data missing record is missing a value for a missing field out of the fields.

At 530, the method identifies a closest record to the data missing record, wherein the closest record is a member of a hierarchical cluster out of a plurality of hierarchical clusters as described herein.

At 550, the method determines a mean estimate for the missing field based on records in the hierarchical cluster as described herein.

At 560, the method determines a record similarity between the data missing record and the closest record as described herein.

At 570, the method imputes a value for the missing field of the data missing record, wherein the imputing comprises adjusting an observed value for the missing field of the closest record based on the record similarity as described herein.

Example 10—Example Partitioning

Figure 6:
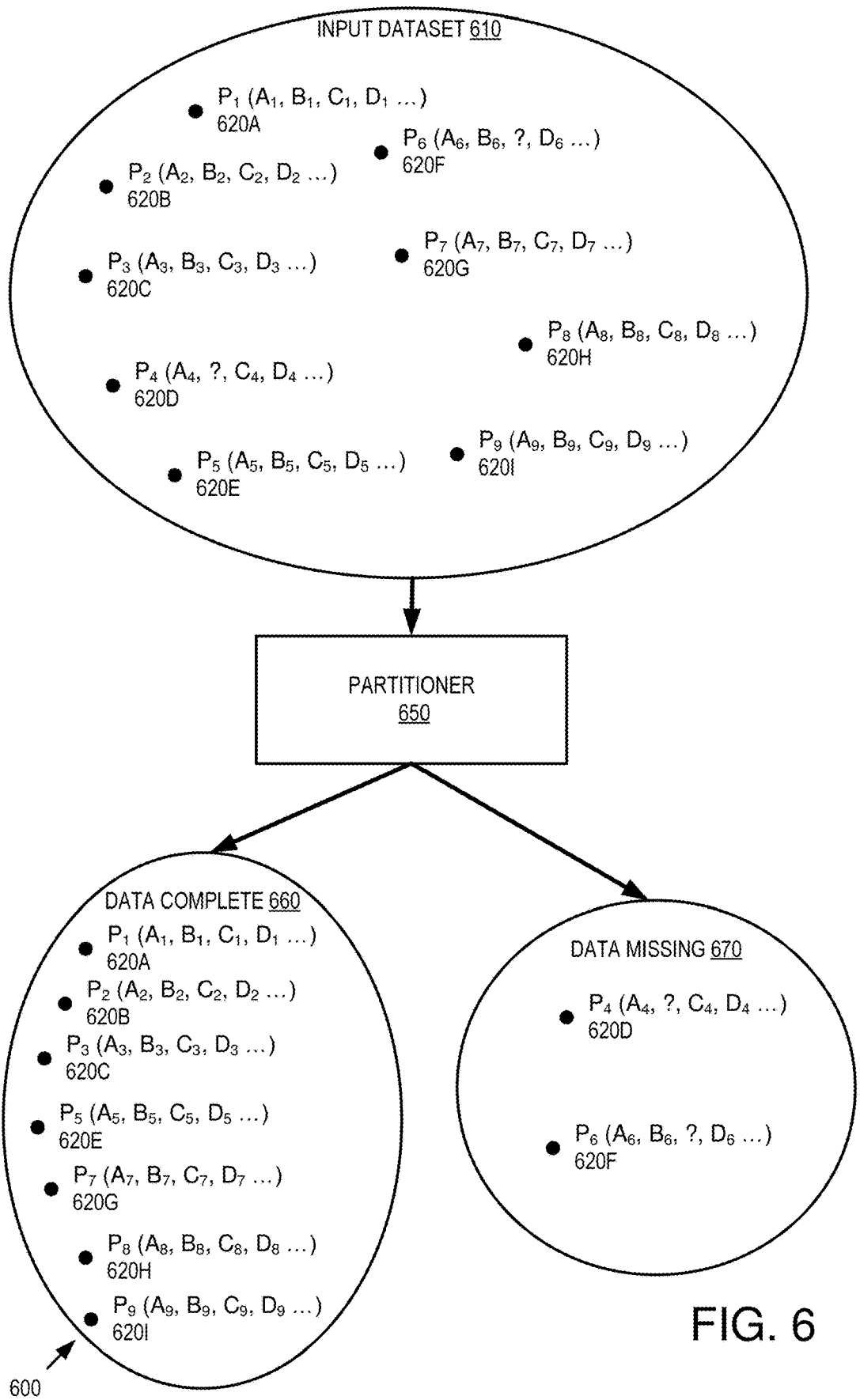
FIG. 6 is a block diagram of an example system performing partitioning.

FIG. 6 is a block diagram of an example system 600 performing partitioning that can be used in any of the examples herein (e.g., by any of the partitioners described herein). In the example, an input dataset 610 comprises a plurality of records 620A-I.

A partitioner 650 divides the records into data complete records 660 (e.g., $D_{Complete}$) and data missing records 670 (e.g., $D_{Miss}$).

In practice, the partitioner 650 can consider each record and determine whether any values are missing or if a particular field has missing values for any records. Records can be considered serially or in parallel.

In practice, the records need not be moved physically but can be annotated (e.g., have a field that indicates whether the record is complete), placed in lists (e.g., a list of data missing records), or the like.

Some records may be filtered due to missing values for too many fields (e.g., over a threshold) or due to missing values for specified fields (e.g., from a list of required fields).

Example 11—Example Hierarchical Clustering

Figure 7:
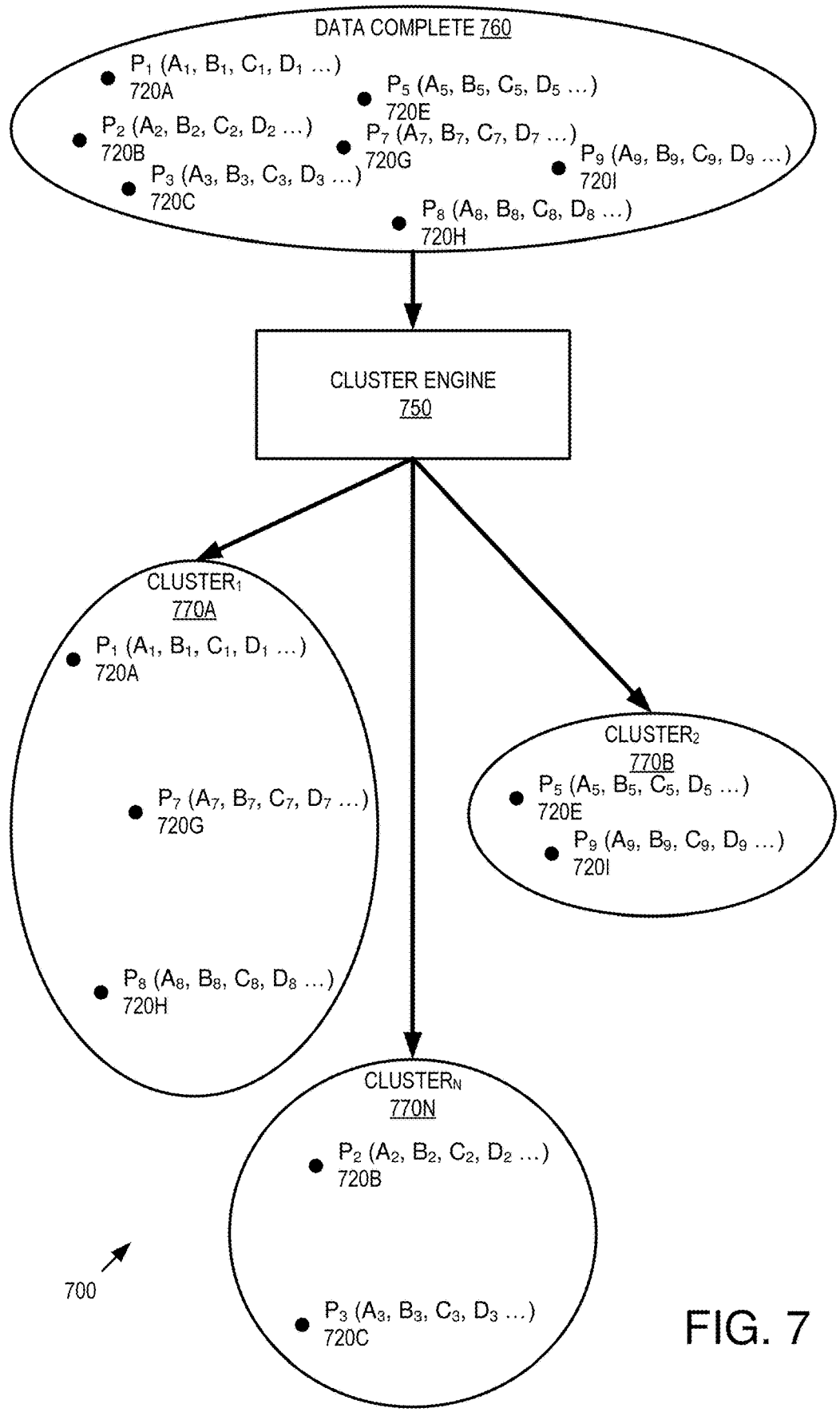
FIG. 7 is a block diagram of an example system performing hierarchical clustering.

FIG. 7 is a block diagram of an example system 700 performing hierarchical clustering that can be used in any of the examples herein where clustering is desired.

Hierarchical clustering can begin by selecting features of the records for clustering. Such fields can be selected manually (e.g., input is received from a user device) or automatically (e.g., all fields are used, fields with determined maximum relevance are selected, or the like).

In the example, the data complete records 760 are received and placed into clusters 770A-770N via hierarchical clustering by a cluster engine 750.

The cluster engine can perform an algorithm (e.g., HiCL) for clustering the input data set. Hierarchical clustering can serve as a good alternative to the K-mean cluster algorithm because it can be more sensitive in discovering outliers or aberrant groups or records. It is typically easier to interpret the resulting clusters.

Although not shown, data missing records can also be clustered if desired to find cluster membership for them. Or, a separate technique can be used after clustering is performed, such as determining distance between a data missing record and a cluster.

Example 12—Example Maximum Relevance

In any of the examples herein, maximum relevance (e.g., MaxRelv) can be used to select which fields are used for clustering (e.g., feature selection). Maximum relevance can search for features that approximate Max-Dependency with the mean value of dependency values between the target class D and individual features (e.g., $A_i$). Let $C=A_1$, $A_2, \ldots A_j$, where $A_1, A_2, \ldots A_n$ are the attributes of the dataset and $S \subseteq C. MaxRelvR(S,D)$ $$R = 1/|S| \sum_{Ai \in S} \gamma Ai(D)$$

Example 13—Example Cluster Determination

Figure 8:
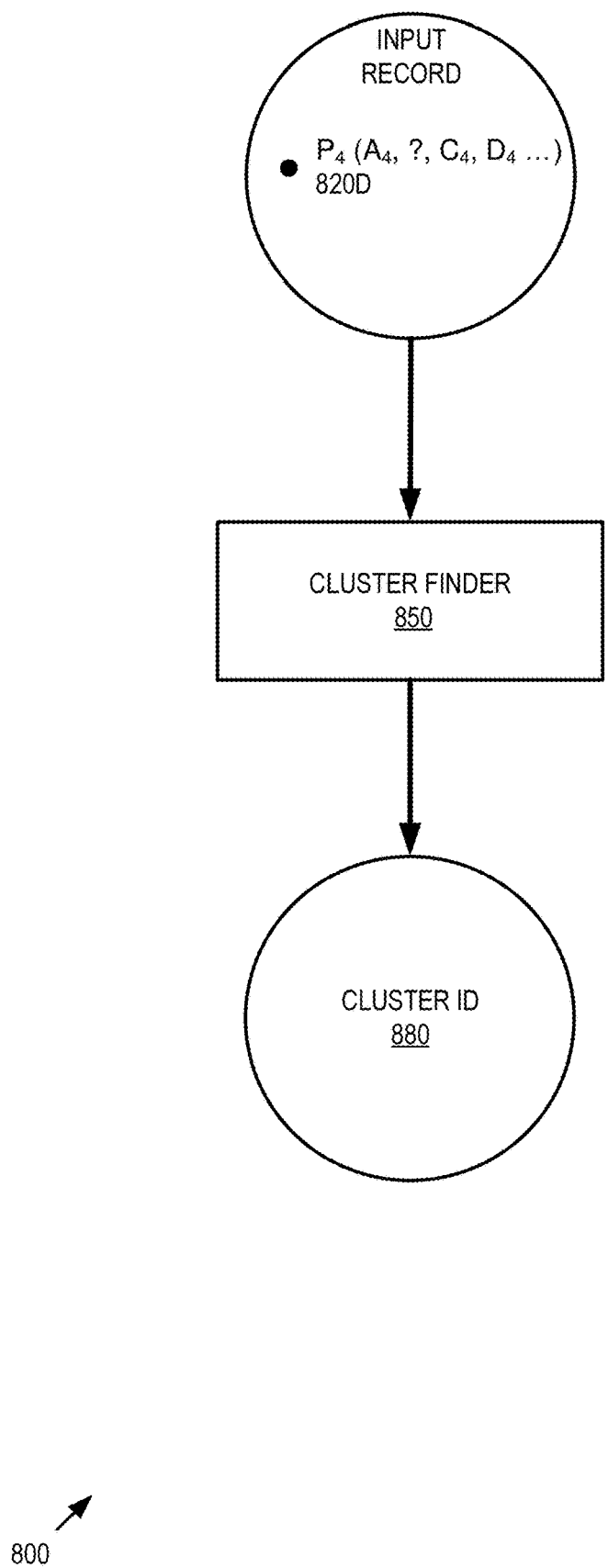
FIG. 8 is a block diagram of an example system determining a cluster.

FIG. 8 is a block diagram of an example system 800 determining a cluster that can be used in any of the examples herein.

A cluster finder 850 finds to which cluster the input record 820D (e.g., a data missing record) belongs. The output is an indication of the cluster (e.g., cluster identifier 880). For a given input record 820D (e.g., $D_{miss}(i)$), a Euclidean distance formula can be applied to the input record 820D and the data complete records. The closest data complete record (e.g., CR) and the cluster ID of the closest data complete record can be determined from the Euclidean distance calculations (e.g., the lowest distance indicates a closest record, and the cluster of the closest record).

Example 14—Example Closest Record Determination

Figure 9:
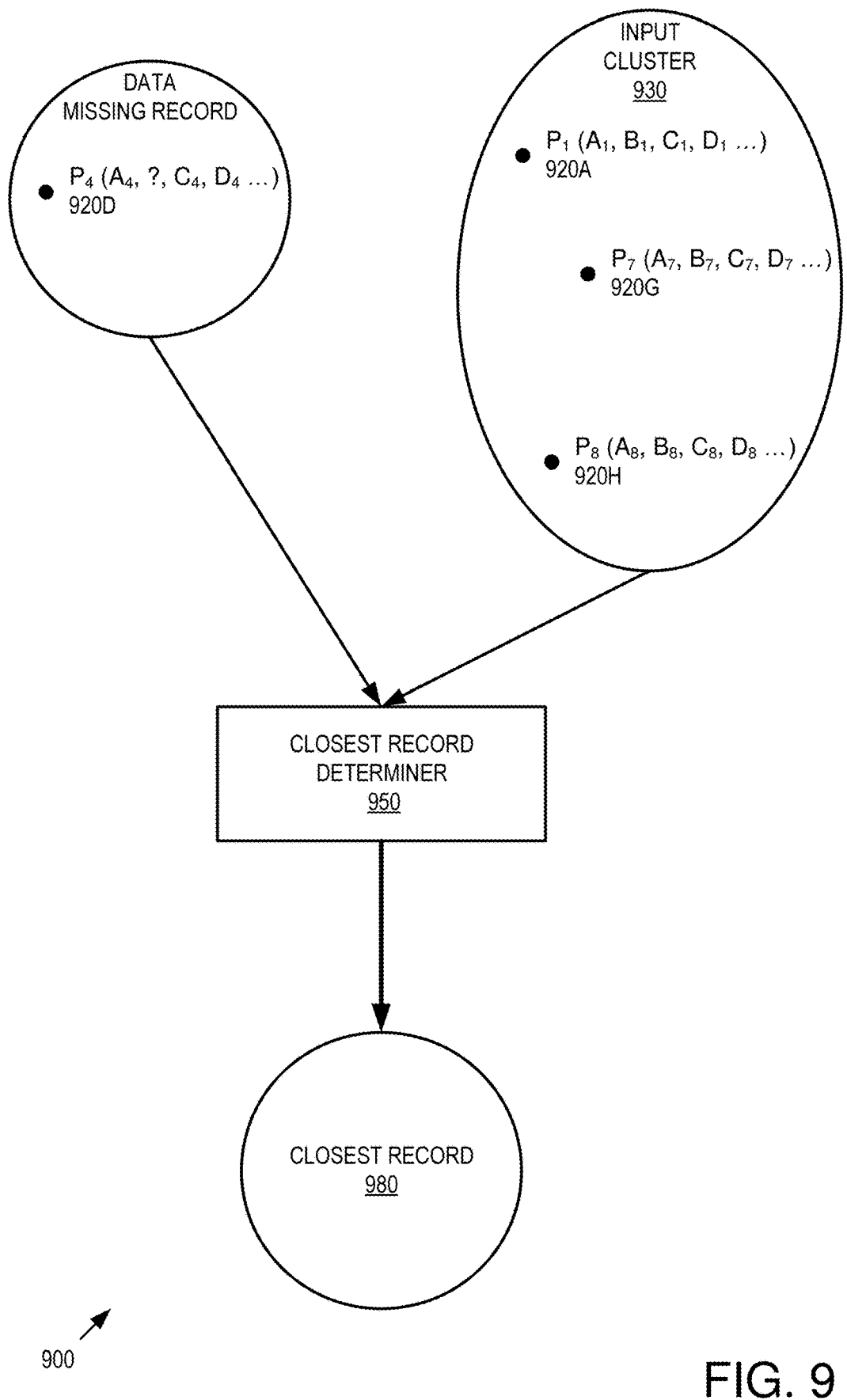
FIG. 9 is a block diagram of an example system determining a closest record within a cluster.

FIG. 9 is a block diagram of an example system 900 determining a closest record within a cluster that can be used in any of the examples herein.

A data missing record 920D and an input cluster 930 can be received by a closest record determiner 950, which outputs the closest record to the data missing record 920D in the cluster 930.

The closest record determiner 950 can select the closest record using Euclidean distance calculation. Euclidean distance for records in the cluster 930 can be calculated, and the record with the least Euclidean distance can be used. In practice, optimizations of the calculation may result in performing the Euclidean distance calculation for fewer than all the records of the cluster 930. Also, in some cases, the closest record 980 determined may not actually be the closest record, but one of the closer records (e.g., an estimate of the closest record).

An example Euclidean distance calculation assumes there are two records U $(U_1, U_2, \ldots U_m)$ and V $(V_1, V_2, \ldots V_m)$. The distance metric is as follows:

$$EucliDis(U, V) = \sqrt{\sum_{i=1}^{n} (V_i - U_i)^2}$$

The acts for the system 800 and 900 can be merged so that a single process returns both the closest record and the cluster to which such cluster belongs.

Example 15—Example Imputed Value Determination

Figure 10:
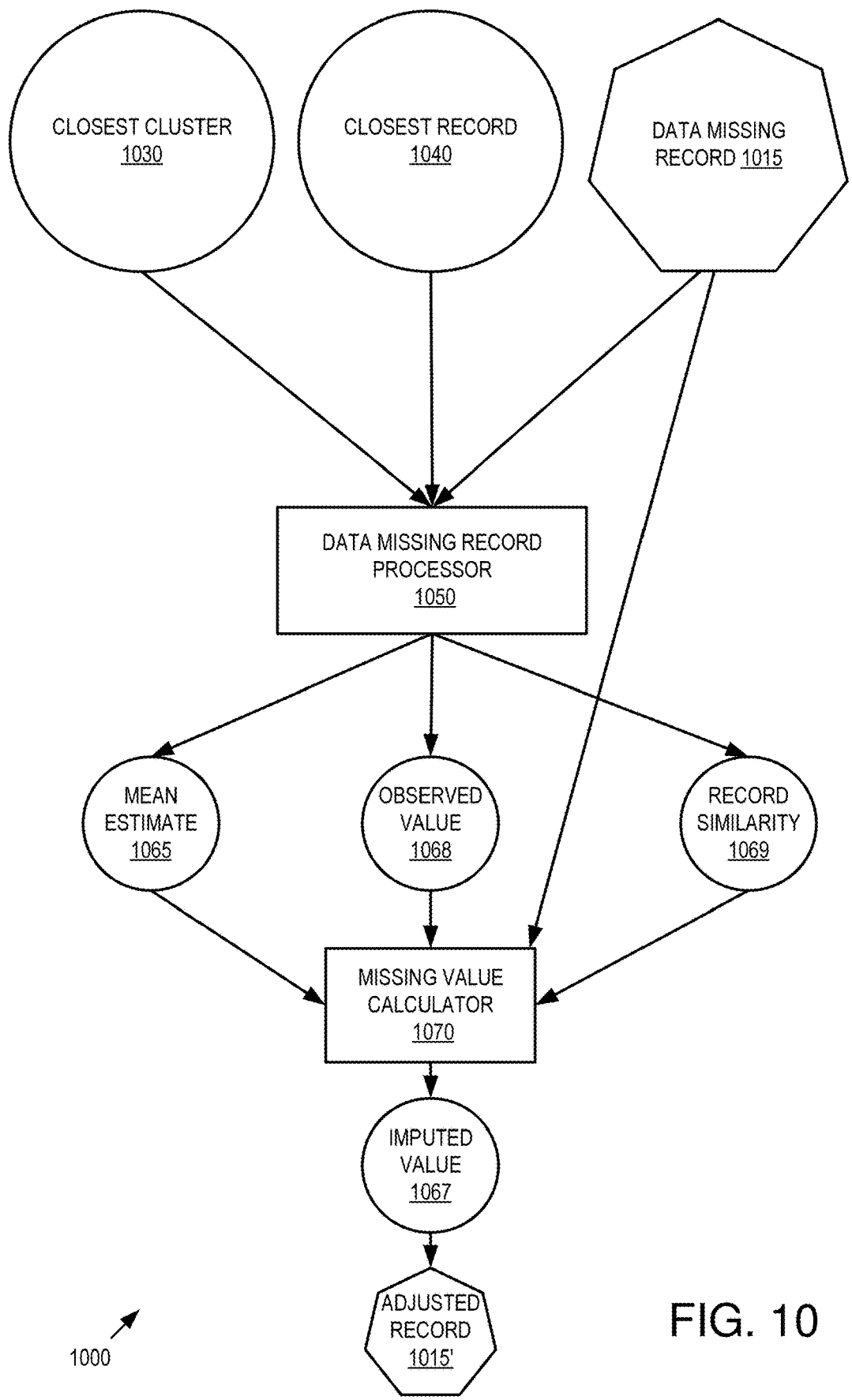
FIG. 10 is a block diagram of an example system configured to determine an imputed value based on data missing record processing.

FIG. 10 is a block diagram of an example system 1000 configured to determine an imputed value based on data missing record processing that can be used in any of the examples herein.

The data missing record processor 1050 receives an indication of the closest cluster 1030, an indication of the closet record 1040, and the data missing record itself 1015. From such input, the processor 1050 can generate a mean estimate 1065 (an estimate of the mean of values for the field for which the value is missing from the data missing record), an observed value 1068 (e.g., a value observed for the field for which the value is missing) (e.g., from the closest record 1040), and a record similarity value 1069 (e.g., similarity between the closest record 1040 and the data missing record 1015).

A missing value calculator takes the same as input, along with the data missing record 1015 and outputs an imputed (e.g., estimated) value 1067 for the field for which the value is missing). The imputed value 1067 is then used to complete the data missing record, resulting in the adjusted record 1015'. As described herein, processing can be repeated for plural data missing records 1015.

Example 16—Example Estimated Mean

Figure 11:
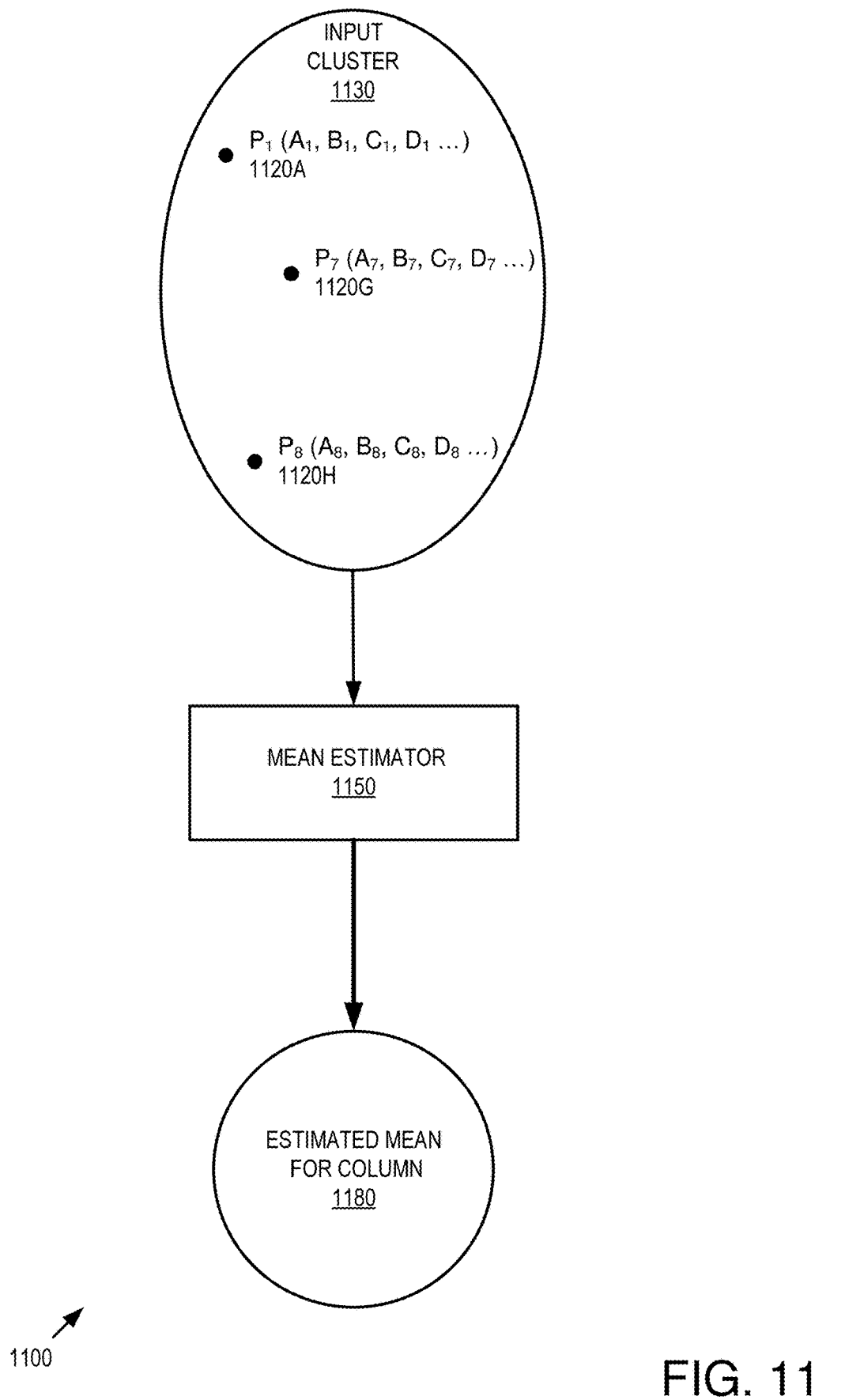
FIG. 11 is a block diagram of a system determining an estimated mean.

FIG. 11 is a block diagram of a system 1100 determining an estimated mean. A mean estimator takes as input an input cluster 1130 (the cluster of which the data missing record is a member) and generates an estimated mean 1180 for a column (e.g., a column for which the value is missing in the data missing record).

In practice, mean can be estimated by using a simple mean, trimmed mean, or the like.

A trimmed mean can discard the highest and/or lowest n records from the cluster 1130 and calculate a mean (e.g., average) of the remaining values. A trimmed mean avoids the influence of extreme values:

$$\text{Trimean} = \left(\sum_{i=k+1}^{n-k} X_i\right) / n - 2k$$

where the smallest and largest value are omitted (e.g., k=1 or the like).

Example 17—Example Missing Value Determination

Figure 12:
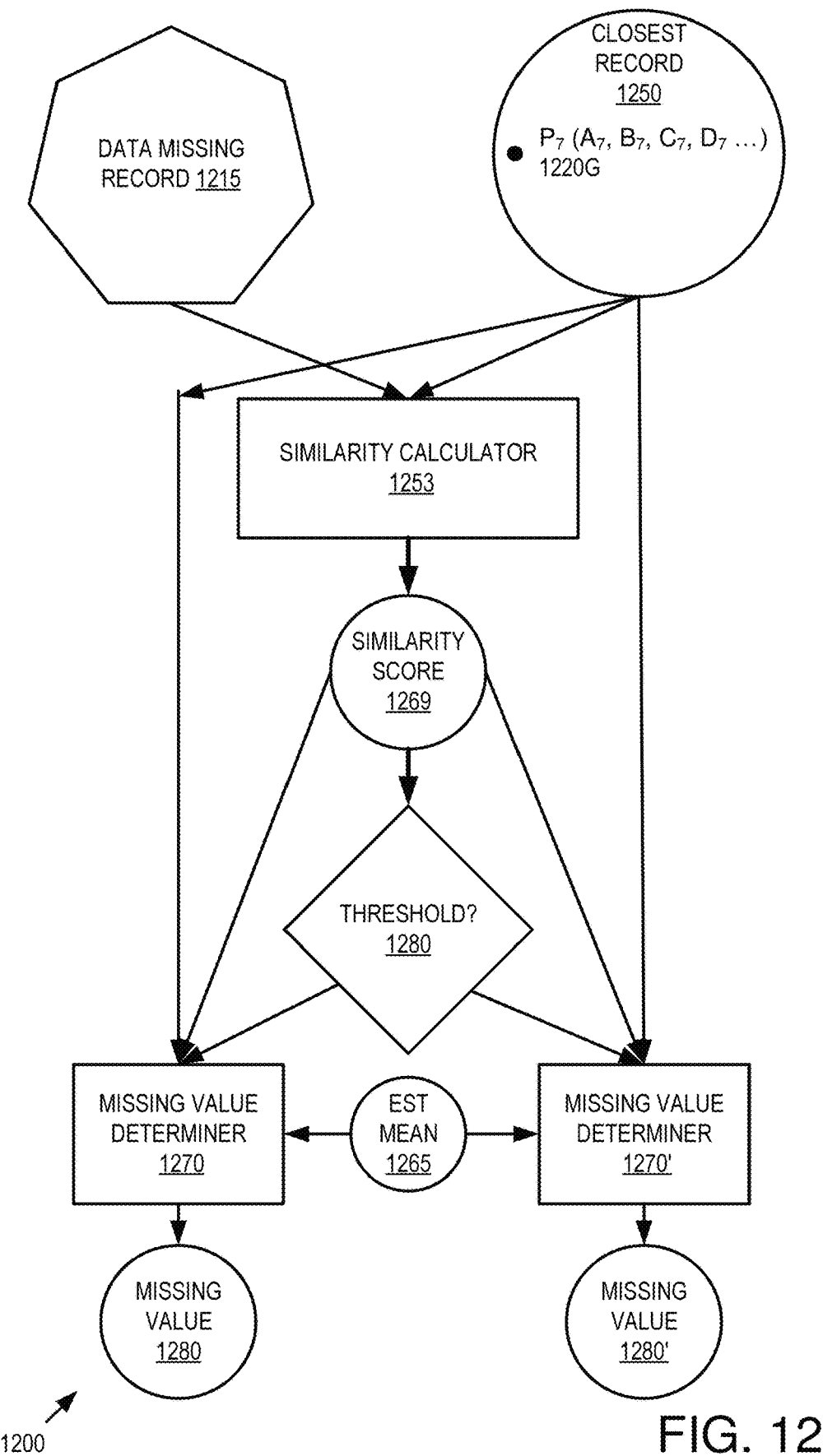
FIG. 12 is a block diagram of a system determining a missing value based on a similarity score.

FIG. 12 is a block diagram of a system 1200 determining a missing value based on a similarity score that can be used in any of the examples herein.

A similarity calculator 1253 can receive as input a data missing record 1215 and a closest record 1250 and output a similarity score 1269. The similarity score can be determined from a cosine similarity calculation. If the similarity score meets a threshold, one missing value determination 1270 can be performed using the estimated mean 1265, a value from the closest record 1250, and similarity score 1269 to generate the missing value 1280. Otherwise, a different missing value determination 1270' can be performed using the estimated mean 1265, a value from the closest record 1250, and similarity score 1269 to generate the missing value 1280'

Either way, a missing value (e.g., 1280 or 1280') can be determined and used for the missing value of the data missing record.

Example 18—Example Flexible Imputation Implementation for Walk Through

Figure 13:
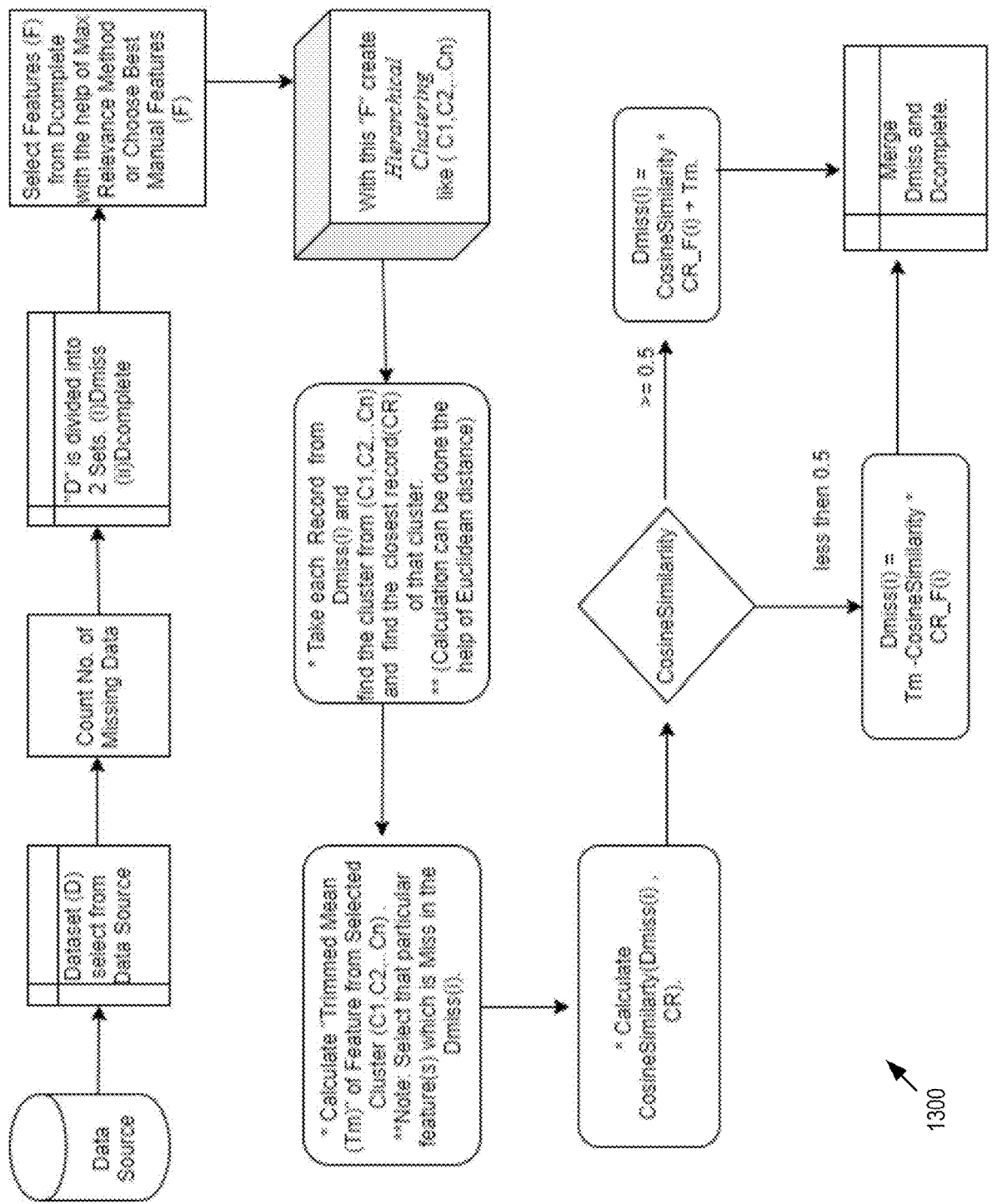
FIG. 13 is a block diagram of an example system for performing flexible imputation of missing data.

FIG. 13 is a block diagram of an example implementation 1300 for performing flexible imputation of missing data that can be used in any of the examples herein and is sometimes called the "hybrid model" because it can work on both normalized and non-normalized datasets.

In the example, a dataset (D) is selected from the data source. The number of records having missing data is counted.

D is divided into 2 sets: $D_{miss}$ and $D_{complete}$. Features (F) are selected from $D_{complete}$ with the help of the Max Relevance method by choosing the best features manually.

With F, hierarchical clustering is created, resulting in clusters $(C_1, C_2, \ldots C_a)$.

Each record from $D_{miss}$ is taken ($D_{miss}(i)$) and the associated cluster from $(C_1, C_2, \ldots C_n)$ is found. From the cluster, the closest record CR is found. Euclidean distance can be used to find CR, which has a feature CR_F(i) (the same feature that is missing from $D_{miss}(i)$).

The trimmed mean (Tm) of a feature from the selected cluster can be calculated (e.g., for the feature(s) which are missing in $D_{miss}(i)$). The feature can be selected responsive to determining that it is missing from $D_{miss}(i)$).

A cosine similarity software function is invoked that calculates cosine similarity for $D_{miss}(i)$ and CR.

If the cosine similarity is greater than or equal to 0.5, the feature (field with missing value) for $D_{miss}(i)$ is calculated as CosineSimilarity*CR_F(i)+Tm; otherwise, the feature for $D_{miss}(i)$ is calculated as Tm−CosineSimilarity+CR_F(i).

The feature is then imputed for $D_{miss}(i)$. The process can be repeated for additional members of $D_{miss}$. After completing the calculation for the records in $D_{miss}$, the $D_{miss}$ records can be merged into $D_{complete}$.

Example 19—Example Flexible Imputation Implementation for Walk Through (Alternative)

An alternative description of the implementation of FIG. 13 follows.

In, FIG. 13, the input dataset (D) is split into two subsets: (a) $D_{complete}$ and (b) $D_{miss}$. $D_{complete}$ contains non-missing data (e.g., the records are complete) and $D_{miss}$ contains records with missing data.

Max Relevance methods can select the features from $D_{complete}$ and returns the selected features from $(F_1, F_2, F_3, \ldots, F_f)$ for clustering. After selecting the features $(F_1, F_2, F_3, \ldots, F_f)$ from the $D_{complete}$ Subset Dataset, then Hierarchical Clustering is applied to the $D_{complete}$ Subset dataset.

Then, each record $(D_{miss}R_i)$ is selected from $D_{miss}$ and the closest record from $D_{complete}$ is found (i.e., $(D_{complete}R_i)$) with the help of Euclidian Distance formula. Now, the two vectors $D_{miss}R_i$ and $D_{complete}R_i$ are taken and applied into the cosine similarity method, which returns $X_{imp}$. Now impute the missing $D_{miss}(i) = X_{imp} * D_{complete}R_i \rightarrow A_i$.

The model can work on both supervised or unsupervised learning datasets. If the dataset is supervised, then max-relevance method can be active, because max relevance is typically used for feature selection in supervised learning dataset. If the dataset is unsupervised, then max-relevance method need not be used. Instead, all the features can be selected for clustering.

The algorithm can proceed as follows:

Act 1: Divide the whole dataset D into two Subsets.
1 $D_{No.Missing}$ i.e., contains no Missing Data
2 $D_{miss}$ i.e., contains Only Missing Data Act 2: Select features from the Subset Dataset $(D_{No.Missing})$ with the help of MaxRel($D_{No.missing}$) function and return $(F_1, F_2, F_3, \ldots, F_f)$ selected features.

Act 3: Apply hierarchical clustering with the selected features ($F_1, F_2, F_3, \ldots, F_f$) and return clusters ($C_1, C_2, C_3, \ldots C_h$).

Act 4: Take each record from $D_{miss}$ and find Closest element of clusters ($C_1, C_2, C_3, \ldots C_h$), i.e. Closestdistance ($D_{missEi}$, Cluster$_{Ci}$) return Closest Element (CE) vector. For Closest Distance Use Euclidean Distance Formula.

Act 5: Apply CosineSim ($D_{miss}$Ei, CE) return Similarity Value.

Act 6: Impu$_{Dmiss}$Ei=SimilarityValue*CE→A$_i$

Act 7: $D_{miss}$(i)=Impu$_{Dmiss}$Ei

Example 20—Example Cosine Similarity Determination

In any of the examples herein, a similarity score (e.g., record similarity) can be determined via cosine similarity (e.g., CosineSim), which is a measure of similarity of two vectors V1, V2. Cosine similarity can measure the cosine of the angle between the two vectors projected in a multi-dimensional space. If the two vectors are the same, then the cosine similarity is 0. Cosine distance can be used for the complement in positive space:

$$CosineSimDis(V1, V2) = 1 - \cos\theta$$

$$\cos\theta = \frac{V1 \cdot V2}{\|V1\| \cdot \|V2\|}$$

Example 21—Example Similarity Adjustment

In any of the examples herein, a similarity adjustment can be a similarity measure (e.g., between the data missing record and the closest record) multiplied by an observed value (e.g., of the same field for the closest record). As described herein, based on the similarity measure, such an adjustment can be made to the mean estimate by adding or subtracting to/from the mean estimate. The resulting value can be used for imputation (e.g., used as the value for the field of the data missing record for which a value is missing).

Example 22—Example Implementation Walk Through

Figure 14:
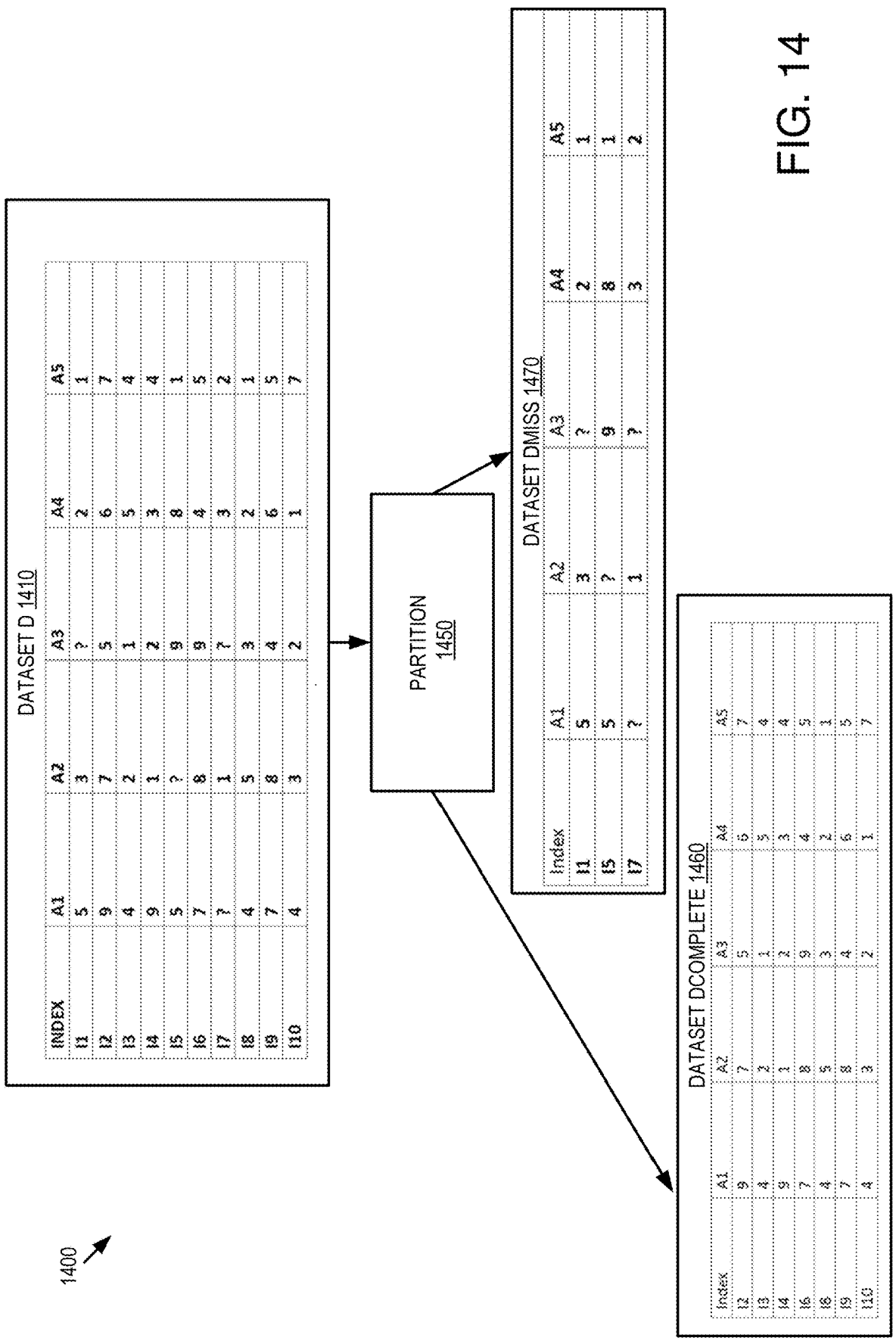
FIGS. 14, 15, and 16 are block diagrams of an example walk through of an implementation of the flexible imputation technology.
Figure 15:
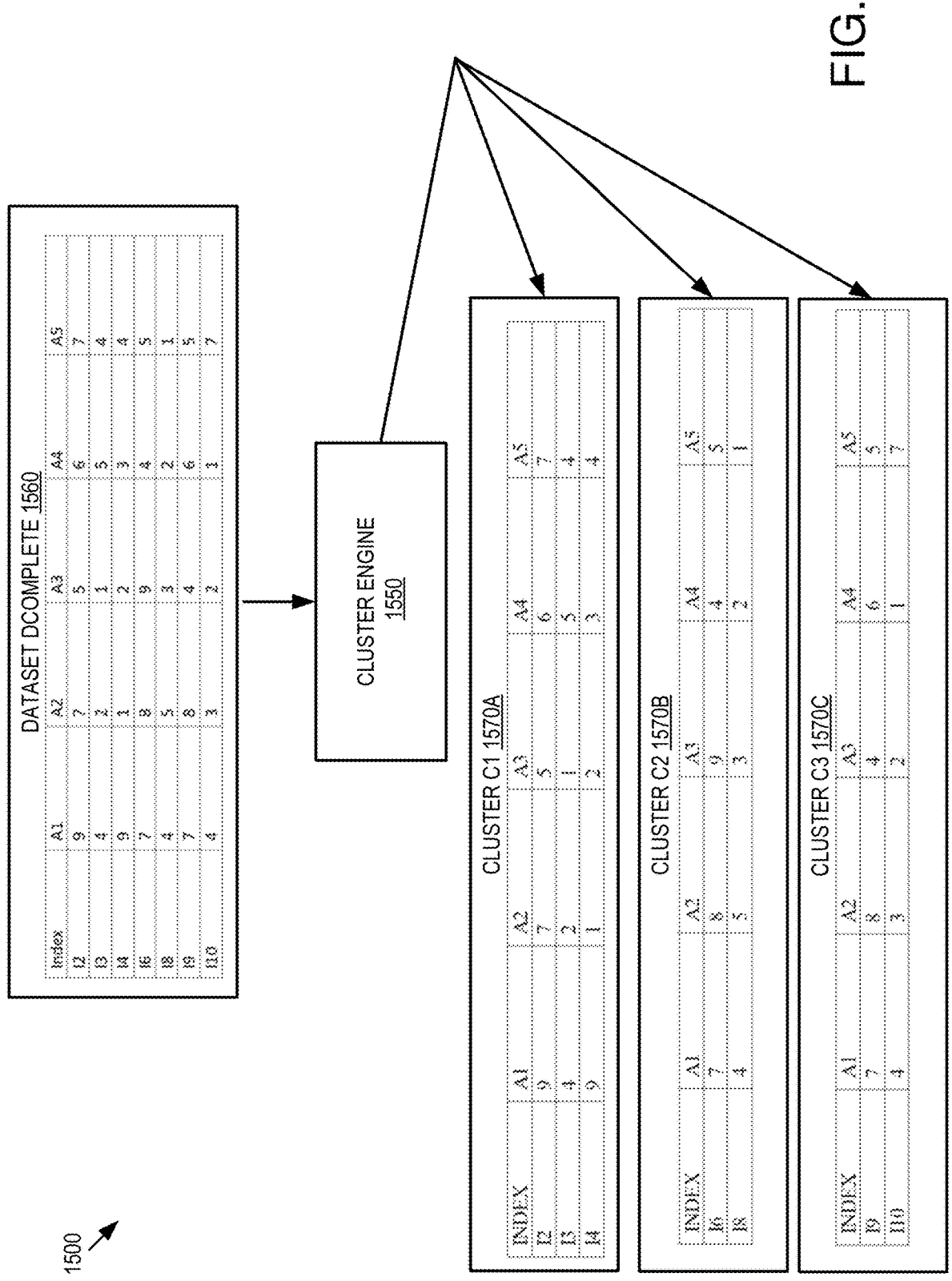
Figure 16:
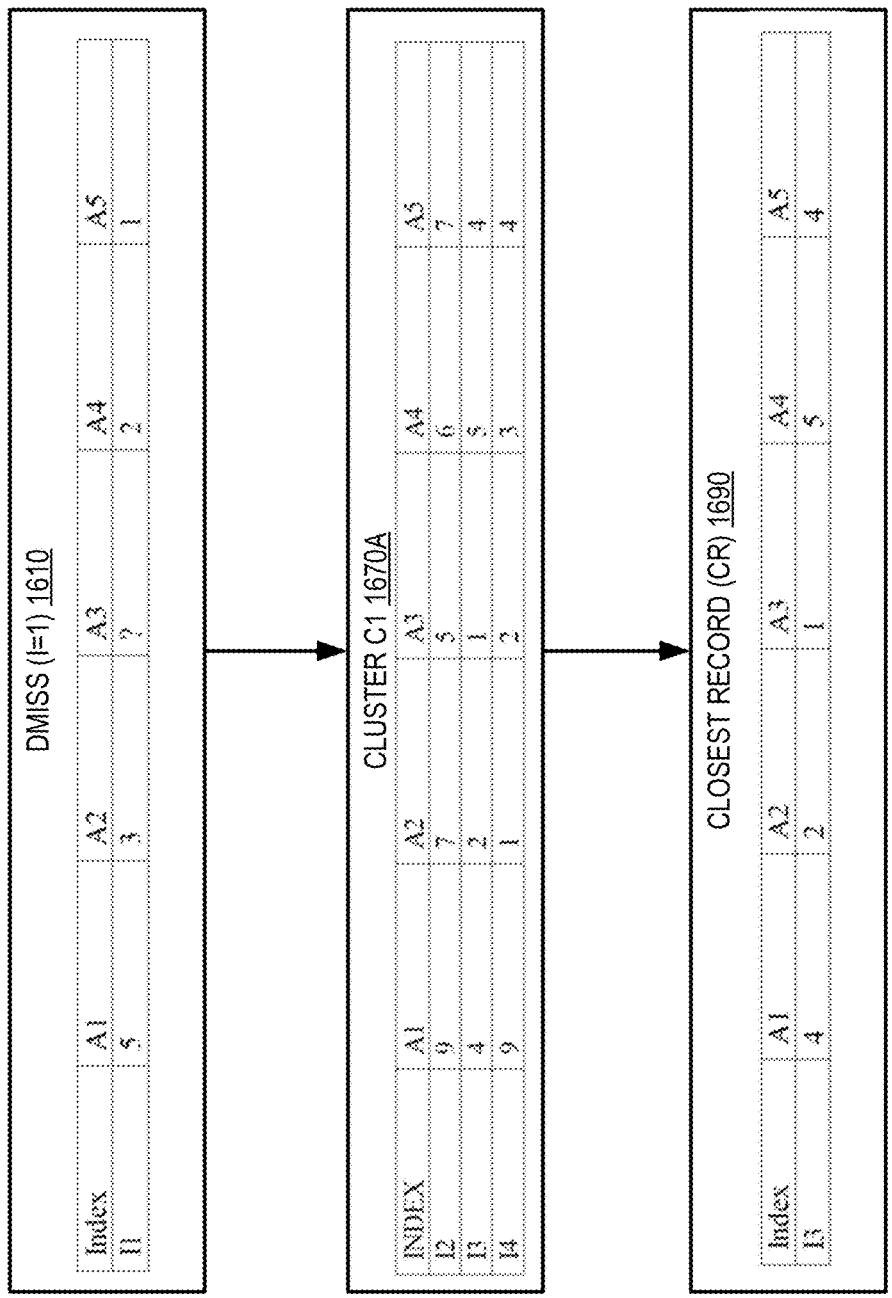

FIGS. 14, 15, and 16 are block diagrams of an example walk through of an implementation of the flexible imputation technology via the so-called "hybrid" model described herein.

The arrangement 1400 of FIG. 14 assumes that "D" is an input dataset 1410 that contains 10 records. The "?" denotes a missing value. The partition 1450 function divides the dataset D 1410 into $D_{complete}$ 1460 (no missing data) and $D_{miss}$ 1470 (contains missing data). In this scenario, 3 records are data missing records, and 7 are complete.

Features can be selected manually from $D_{complete}$ or selected via MaxRelevance from $D_{complete}$ as described herein. In the example, all features are selected (e.g., A1-A5).

In the arrangement 1500 of FIG. 15, hierarchical clustering is applied with the selected features from $D_{complete}$ 1560 to form the clusters 1570A-C by the engine 1550.

Then, each record in $D_{miss}$ is processed as given input record ($D_{miss}$(i)). For the given record, the closest record (CR) and its cluster are found using a Euclidean Distance formula.

In the arrangement of FIG. 16, $D_{miss}$(i) 1610 is shown. The cluster 1670A of the record and the closest record 1690 of the cluster are found. In the example, the cluster of the given record 1610 is cluster 1670A, and the closest record of the cluster is record 1690.

Then, the trimmed mean of the feature(s) from the selected cluster is determined. The features selected for trimmed mean calculation are those that are missing in the given input record. In the example, fm feature data is missing, so the trimmed mean is calculated for fm Tm=trimmed mean(Cs(fm)), where Cs is the selected cluster, and fm is the feature.

In the example, the trimmed mean of A3 is found because a value for A3 is missing from the input record.

The cosine similarity is applied between the closest record and the given input record (CR, $D_{miss}$(i)).

If the cosine similarity is greater than or equal to 0.5, then Dmiss_fi(i)=cosine similarity*CR_fi+Tm; otherwise, it is equal to Tm−cosine similarity*CR_fi.

The method can then loop over remaining given input records from $D_{miss}$.

In the pictured scenario, $D_{miss}$ f(i=1)=0.5*CR_fi+tm, which is 0.5*CR(A3)+Tm, which is 0.5*1+1. (I3 Index A3 feature value is 1).

Example 23—Experiments

Using the described imputation model shown in the Example Implementation Walk Through above (sometimes called the "Hybrid Model"), tests were run with the Pima Indians Diabetes dataset from the University of California Irvine (UCI) Machine Learning Repository at archive.ics.uci.edu/ml/index.php and a Breast Cancer dataset (Breast Cancer Wisconsin) also of the UCI Repository. Results are shown below.

Example 24—Pima Indians Diabetes Dataset

The Pima Indians Diabetes dataset contains 768 instances and 9 attributes. The values are numeric. The attributes of the dataset are Number of Times Pregnant, PlasmaGlucose, BloodPressure, TricepsSkinThickness, Insulin, BodyMassIndexWeight, DiabetesPedigreeFunction, Age, and ClassVariable (I/O). The dataset had no missing values, so a percentage (i.e., 5%, 10%, 50%) of values were randomly removed to generate a data missing condition for testing purposes, and performance of the described model was checked against such data.

Basically, the data is not normalized. Up to 50% of the rows were simulated as missing.

Figure 17:
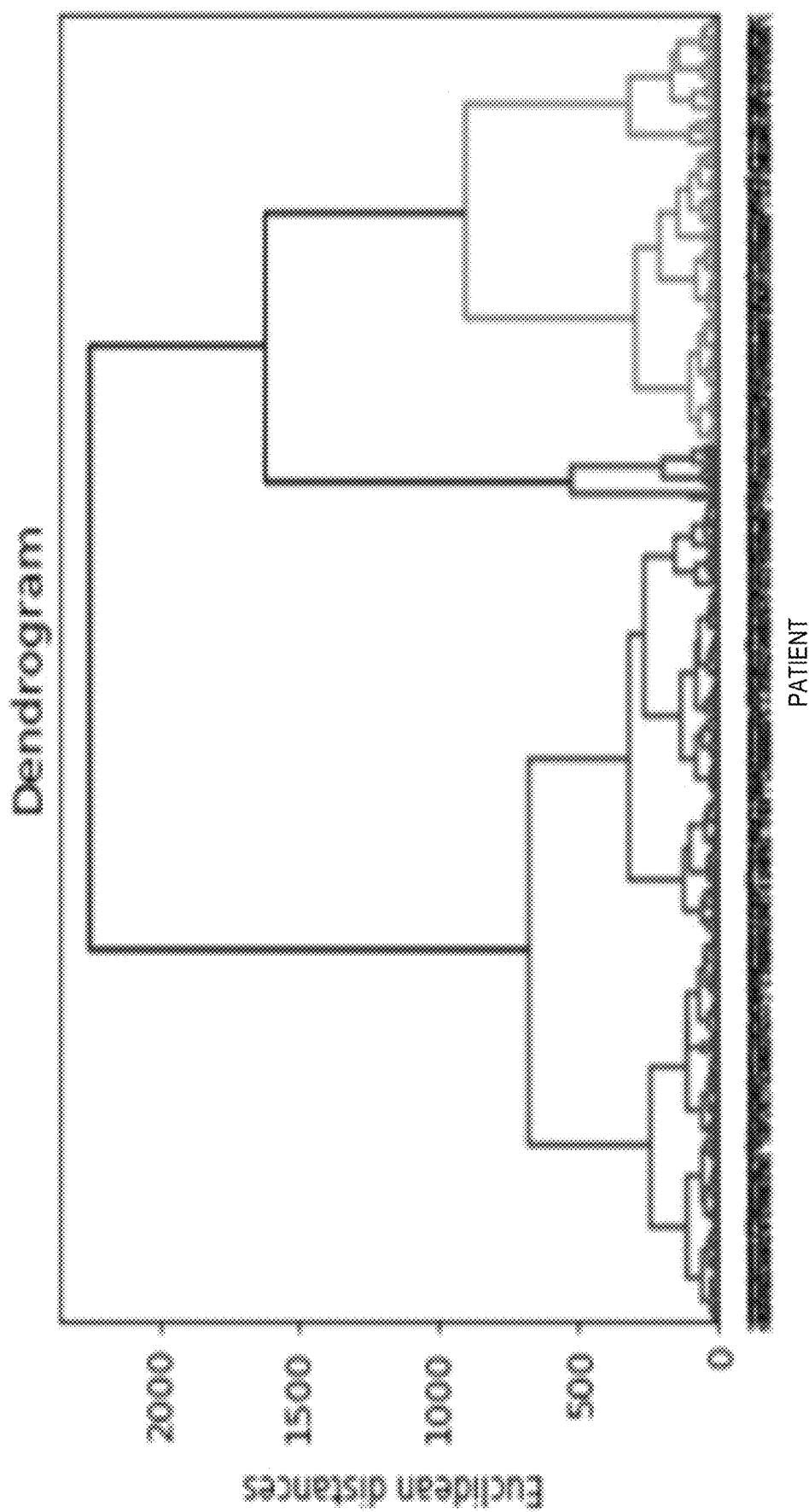
FIG. 17 and FIG. 18 illustrate hierarchical clustering for records of the Pima Indians Diabetes Dataset.
Figure 18:
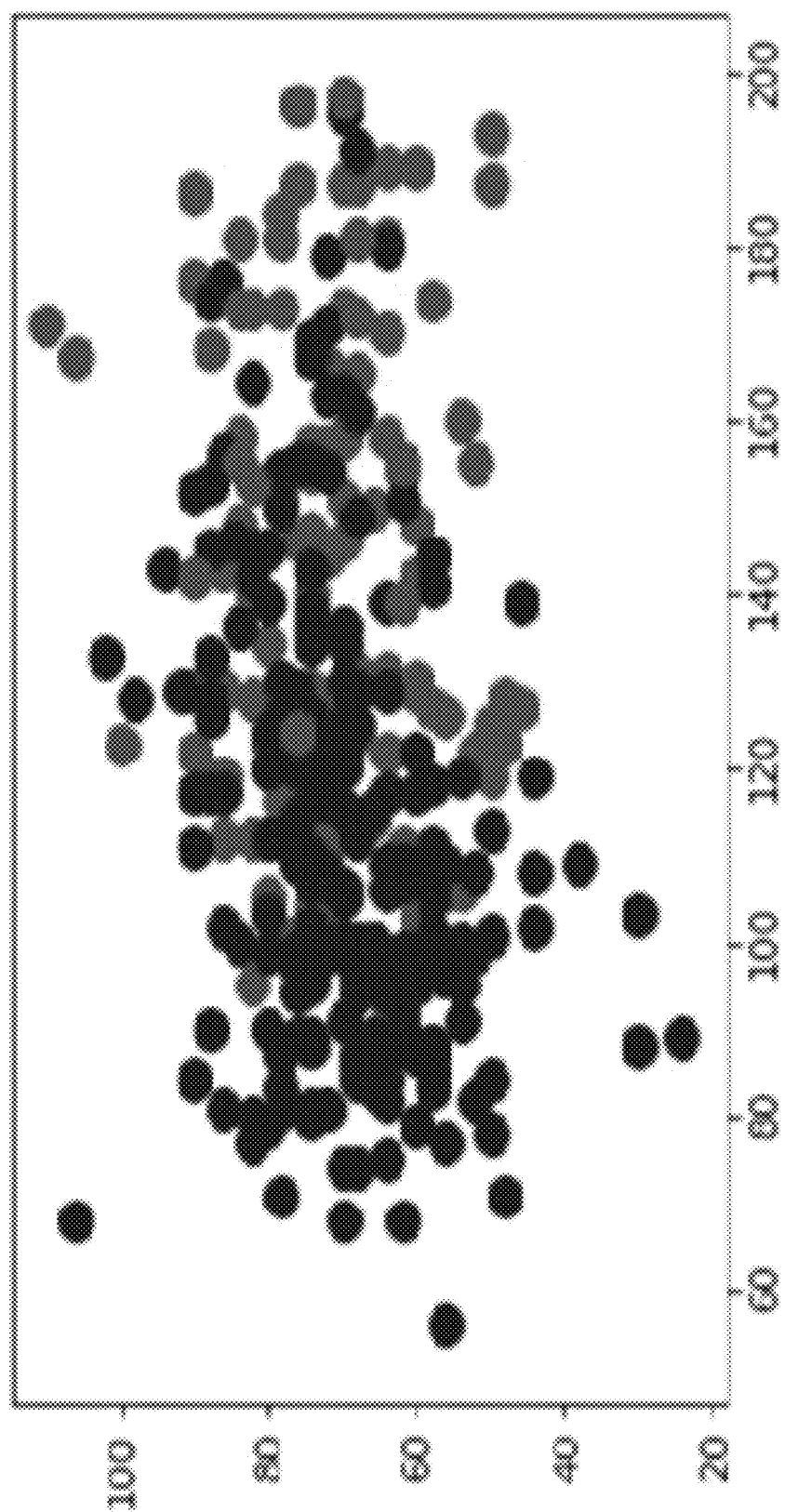

FIG. 17 and FIG. 18 illustrate hierarchical clustering for records of the Pima Indians Diabetes Dataset according to the technologies described herein.

Figure 19:
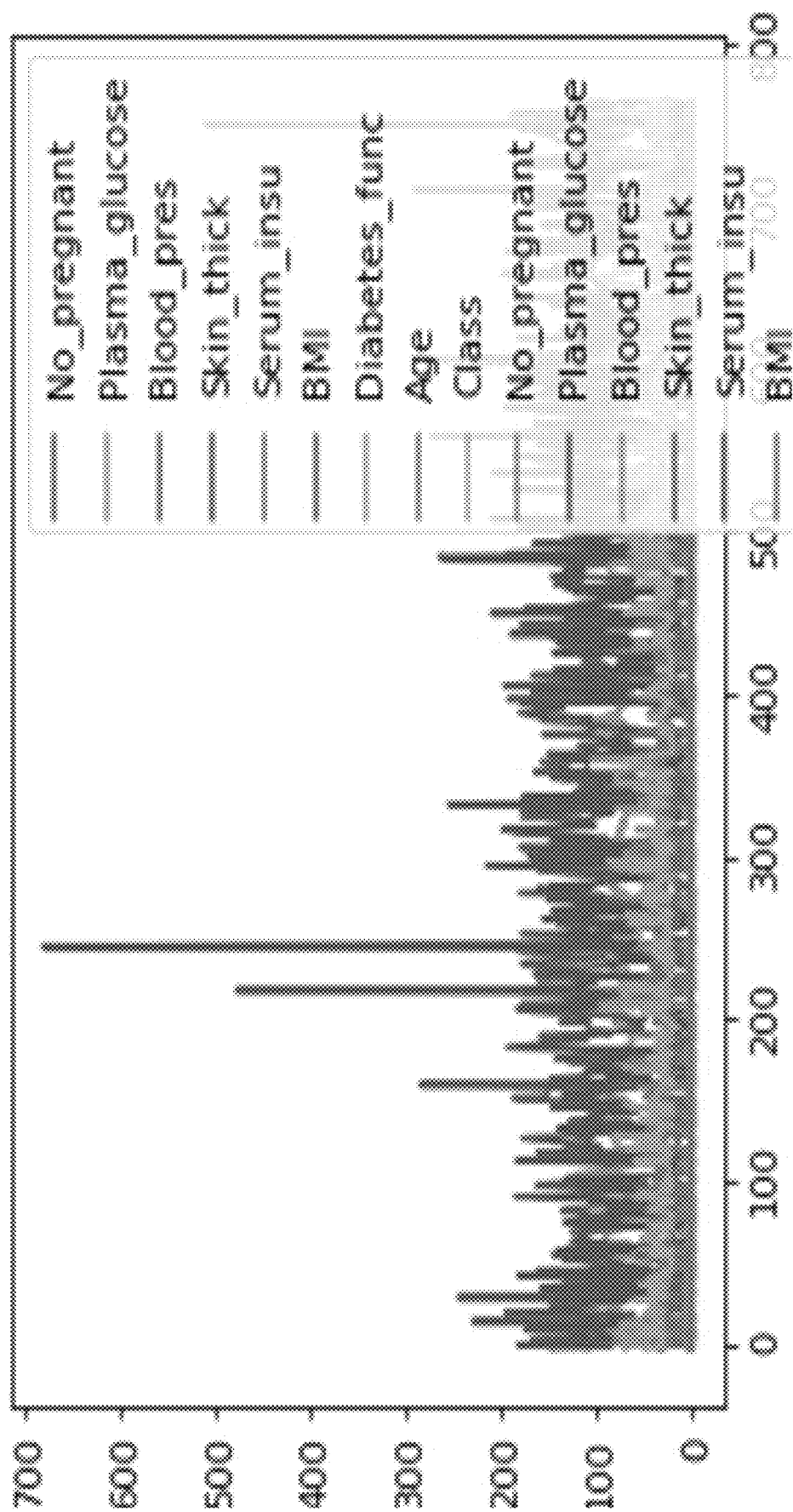
FIG. 19 is a visualization of imputation results for records of the Pima Indians Diabetes Dataset.

FIG. 19 is a visualization of imputation results for records of the Pima Indians Diabetes Dataset according to the technologies described herein.

Table: Imputation Result of Pima Indians Diabetes Dataset

| Index | No. Preg | PlasmaGlucose | BloodPressure | SkinThick | SerumInsulin | BMI | DiaFun | AGE | Class |
|---|---|---|---|---|---|---|---|---|---|
| Data Miss Each Col. | 111 | 5 | 35 | 227 | 374 | 0 | 0 | 0 | 10 |
| RMSE of each Col. | 1.53 | 5.47 | 12.29 | 15.76 | 97.57 | 0 | 0 | 0 | 0.093 |

After Imputation of this Dataset, the total RMSE Value is 33.3

Table: Comparing Hybrid Model with Existing Technologies on the Pima Indians Diabetes Dataset

| Index | Existing Model/Packages | RMSE Value |
|---|---|---|
| 1 | MissFOREST | 40.57 |
| 2 | AMELIA | 42.38 |
| 3 | MICE | 37.83 |
| 4 | HMISC | 35.73 |
| 5 | HybridModel | 33.3 |

Table: Comparing Hybrid Model with Existing Technologies on the Breast Cancer Dataset

| Index | Existing Model/Packages | RMSE Value |
|---|---|---|
| 1 | MissFOREST | 0.18 |
| 2 | AMELIA | 0.17 |
| 3 | MICE | 0.173 |
| 4 | HMISC | 0.167 |
| 5 | HybridModel | 0.16 |

Figure 20:
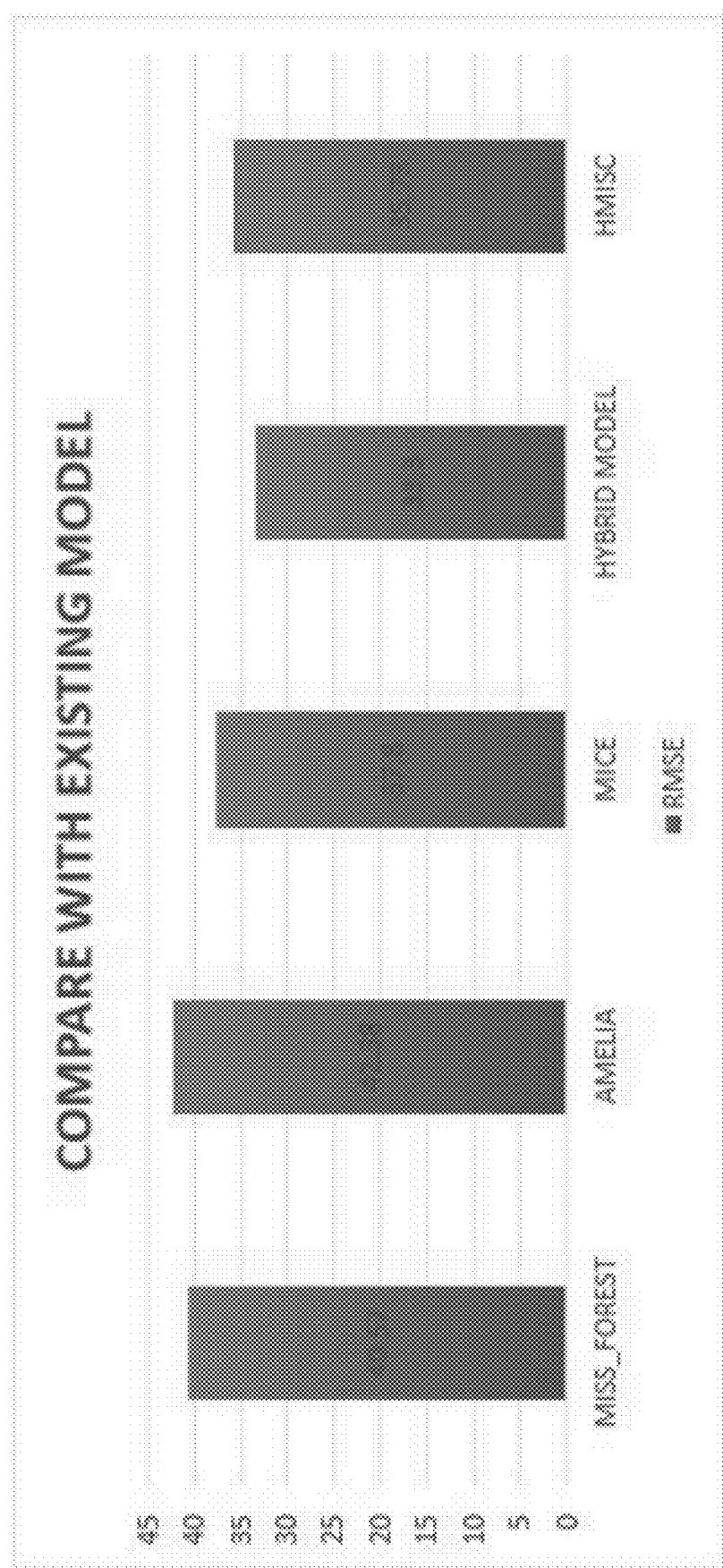
FIG. 20 is a bar chart providing a visualization of comparative analysis of different imputation methods of the Pima Indians Diabetes Dataset.

FIG. 20 is a bar chart providing a visualization of comparative analysis of different imputation methods of the Pima Indians Diabetes Dataset, including the technologies described herein ("Hybrid Model").

Figure 23:
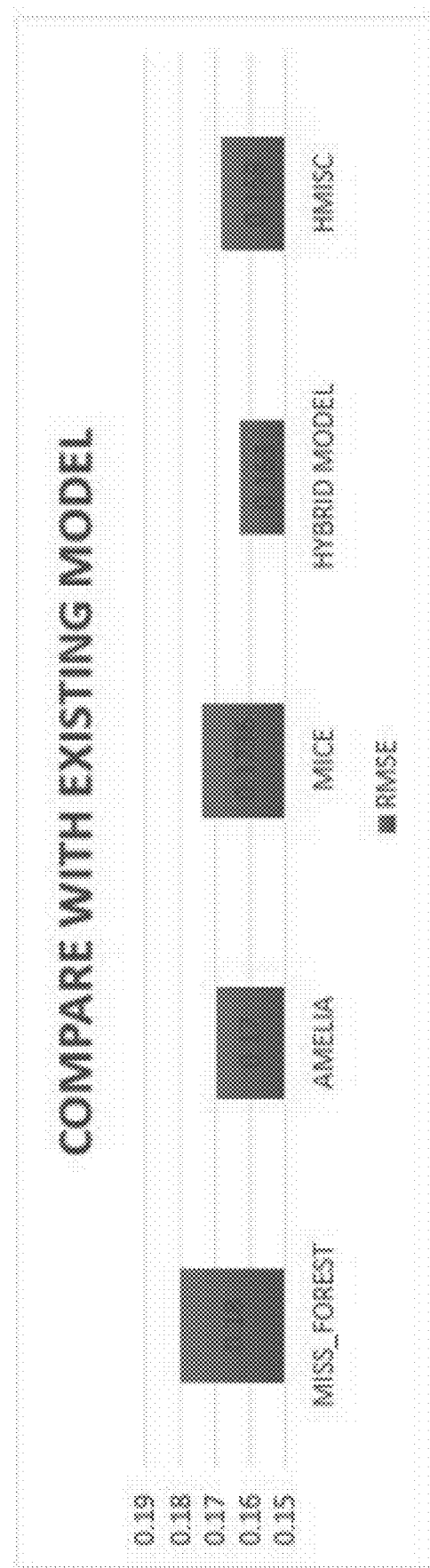
FIG. 23 is a bar chart providing a visualization of comparative analysis of different imputation methods of the Breast Cancer Dataset.

FIG. 23 a bar chart providing a visualization of comparative analysis of different imputation methods of the Breast Cancer Dataset, including the technologies described herein ("Hybrid Model").

Example 25—Breast Cancer Dataset

The Breast Cancer dataset has 699 instances and 11 attributes. The attributes of the dataset are Class, Age, Menopause, Tumor size, Inv Nodes, Nodes caps, DegMalig, Breast(left/right), Breast quad, and Irradiat. The dataset had no missing values, so a percentage (i.e., 5%, 10%, 50%) of values were randomly removed to generate a data missing condition for testing purposes, and performance of the described model was checked against such data.

Basically, the dataset is normalized. Up to 50% of the rows were simulated as missing (e.g., "NaN" can represent missing data).

Figure 21:
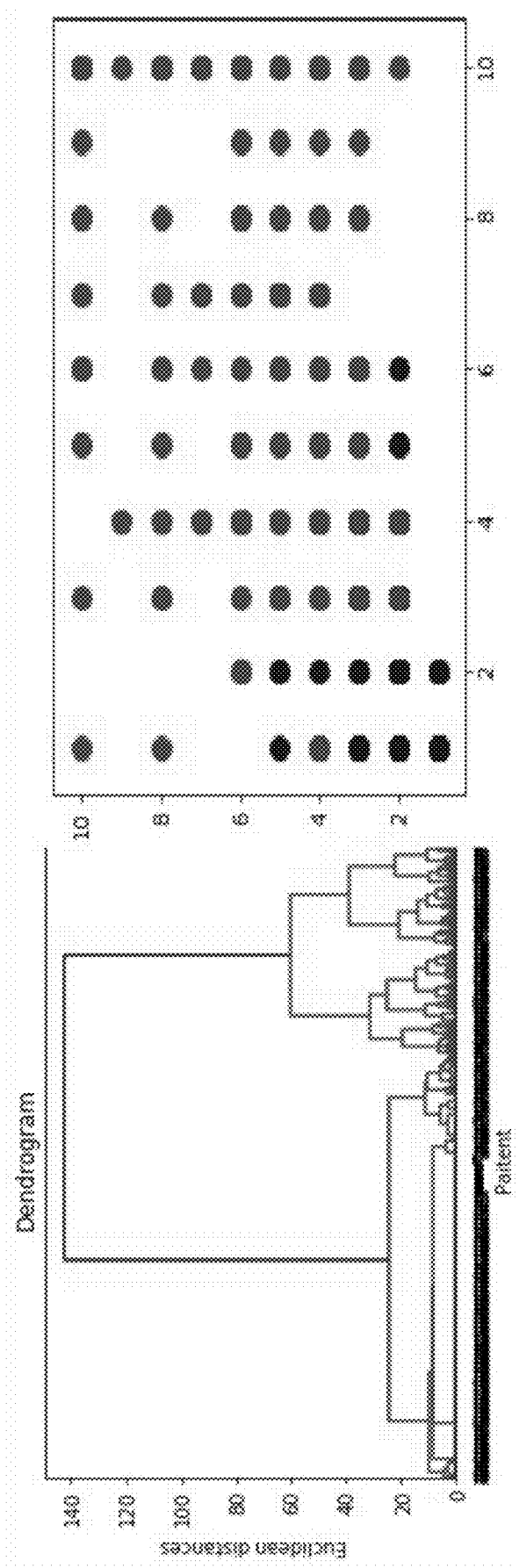
FIG. 21 illustrates hierarchical clustering for records of the Breast Cancer Dataset.

FIG. 21 illustrates hierarchical clustering for records of the Breast Cancer Dataset according to the technologies described herein.

Figure 22:
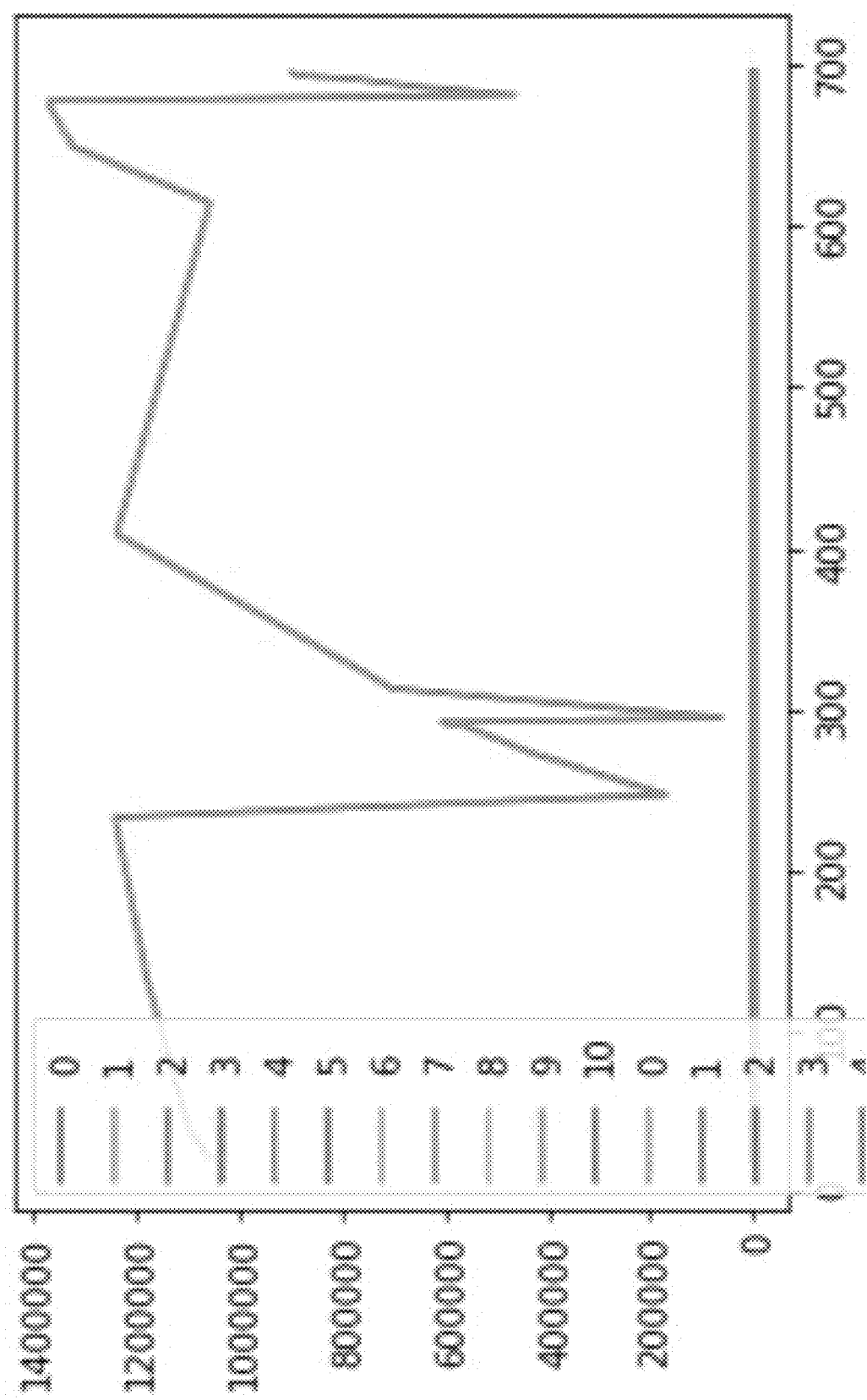
FIG. 22 is a visualization of imputation results of the Breast Cancer Dataset.

FIG. 22 is a visualization of imputation results of the Breast Cancer Dataset according to the technologies described herein.

Example 26—Root Mean Square Error

RMSE is the standard deviation of the residuals (e.g., prediction errors). Where A is the actual value, E is the predicted values, and N is the sample size:

$$RMSE = \sqrt{\frac{1}{n}\sum_{i=1}^{n}(A_i - E_i)^2}$$

Example 27—Experimental Results

Using the above methodology, it can be seen that there is no information loss and the approximate result is good for both non-normalized and normalized datasets in contrast with existing technologies. The methodology gives good approximate result, if the dataset contains 5%-10% missing

Table: Imputation Result for Breast Cancer Dataset

| Index | Class | Age | Menopause | TumorSize | Invnodes | Node-Caps | Degmalig | Position | Breast-Quad | Irradiat |
|---|---|---|---|---|---|---|---|---|---|---|
| Data Miss Each Col. | 0 | 5 | 3 | 1 | 0 | 2 | 18 | 0 | 0 | 3 |
| RMSE of each Col. | 0 | 0.3 | 0.5 | 0.18 | 0 | 0.18 | 0.3 | 0 | 0 | 0.2 |

After Imputation of this Dataset, the total RMSE Value is 0.166 values. If the dataset has above 50% missing data, then the approximate result is not good.

Thus, the hybrid model is more accurate when compared to other existing models of data imputation. If the missing data is around 5%-10%, the RMSE value is less for the hybrid model. Similar results are even shown when the data is missing around 50% (i.e., the RMSE value for the hybrid model is less when compared to other models). In general, irrespective of whatever percentage of data is missing, the hybrid model shows better results and is more accurate in comparison with other models such as MICE, Amelia (Amelia II of Honaker et al.), missForest, and Hmisc (Harrell Miscellaneous).

Example 28—Example Advantages

A number of advantages can be achieved via the technologies described herein as shown and described. For example, the imputation technologies can work in both normalized and non-normalized dataset scenarios. Further, the accuracy of the imputation can be superior to that of other imputation technologies. Accordingly, downstream uses of the dataset, such as analytics, machine learning, and modeling can result in more accurate results and predictions.

For example, a neural network trained with an augmented dataset as described herein can exhibit greater accuracy than one trained with the original dataset. The augmented dataset can contain records that otherwise could not be used for training. If such records relate to certain circumstances or results, additional circumstances or results can be learned by the neural network.

Example 29—Example Downstream Processing

The technologies can be applied to a number of use cases. The importance of complete data is seen in a variety of predictive model scenarios, including neural networks and the like. So, the augmented dataset in any of the examples herein can be used to build a predictive model, and then a prediction can be made for new data using the predictive model.

Decision-making processes such as predication and classification are highly dependent on the availability of data, from which information can be extracted. Scientific, business, and economic decisions can be related to the information available at the time of making such decisions. Great availability of data leads to more accurate predictive models.

For example, decisions can be highly dependent on the availability of information. Advances in research can be based on discovery of knowledge from various experiments and measured parameters. In many situations, fault detection and identification may still need to operate where the data vector is partially corrupt or otherwise incomplete.

In an Internet of Things (IoT) scenario, a sensor senses data and sends it to a server or datacenter. Due to some fault of the sensor, it may sense invalid data and send such corrupt data to the server or datacenter. Such corrupt data would influence faulty decisions in data science. The technologies herein can be used to impute such missing data to improve the efficiency and correctness of the prediction. For example, if it is determined that a certain threshold of the data is corrupt, then imputation can be used (e.g., automatically) in place of the corrupt data.

In a hospital setting, laboratory test results may be lost due to a missing or damaged sample. For example, a blood sample may be missing, and the virus count in the blood is then unknown. Imputation as described herein can be used to impute a value for the missing value.

In a manual data collection process, there is often missing data. Imputation as described herein can be used to fill in such missing data. For example, a librarian or other recordkeeper may miss a detail, or a research center may misplace or lose results.

A predictive model such as a neural network can be trained using the augmented dataset (e.g., augmented via imputation as described herein). Data can be divided into a training and verification set. Subsequently, a prediction can then be made with the model for new incoming data. Without imputation, some predictions may be impossible or less accurate.

Example 30—Example Computing Systems

Figure 24:
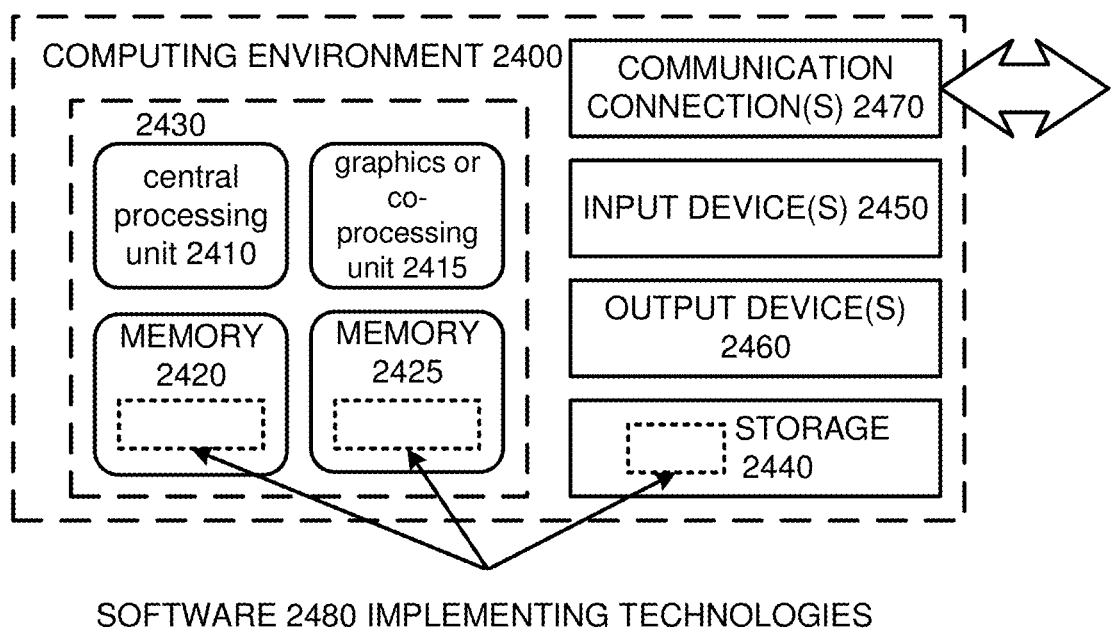
FIG. 24 is a block diagram of an example computing system in which described embodiments can be implemented.

FIG. 24 depicts an example of a suitable computing system 2400 in which the described innovations can be implemented. The computing system 2400 is not intended to suggest any limitation as to scope of use or functionality of the present disclosure, as the innovations can be implemented in diverse computing systems.

With reference to FIG. 24, the computing system 2400 includes one or more processing units 2410, 2415 and memory 2420, 2425. In FIG. 24, this basic configuration 2430 is included within a dashed line. The processing units 2410, 2415 execute computer-executable instructions, such as for implementing the features described in the examples herein. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 24 shows a central processing unit 2410 as well as a graphics processing unit or co-processing unit 2415. The tangible memory 2420, 2425 can be volatile memory (e.g., registers, cache, RAM), non-volatile memory (e.g., ROM, EEPROM, flash memory, etc.), or some combination of the two, accessible by the processing unit(s) 2410, 2415. The memory 2420, 2425 stores software 2480 implementing one or more innovations described herein, in the form of computer-executable instructions suitable for execution by the processing unit(s) 2410, 2415.

A computing system 2400 can have additional features. For example, the computing system 2400 includes storage 2440, one or more input devices 2450, one or more output devices 2460, and one or more communication connections 2470, including input devices, output devices, and communication connections for interacting with a user. An interconnection mechanism (not shown) such as a bus, controller, or network interconnects the components of the computing system 2400. Typically, operating system software (not shown) provides an operating environment for other software executing in the computing system 2400, and coordinates activities of the components of the computing system 2400.

The tangible storage 2440 can be removable or non-removable, and includes magnetic disks, magnetic tapes or cassettes, CD-ROMs, DVDs, or any other medium which can be used to store information in a non-transitory way and which can be accessed within the computing system 2400. The storage 2440 stores instructions for the software 2480 implementing one or more innovations described herein.

The input device(s) 2450 can be an input device such as a keyboard, mouse, pen, or trackball, a voice input device, a scanning device, touch device (e.g., touchpad, display, or the like) or another device that provides input to the computing system 2400. The output device(s) 2460 can be a display, printer, speaker, CD-writer, or another device that provides output from the computing system 2400.

The communication connection(s) 2470 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the context of computer-executable instructions, such as those included in program modules, being executed in a computing system on a target real or virtual processor (e.g., which is ultimately executed on one or more hardware processors). Generally, program modules or components include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

For the sake of presentation, the detailed description uses terms like "determine" and "use" to describe computer operations in a computing system. These terms are high-level descriptions for operations performed by a computer and should not be confused with acts performed by a human being. The actual computer operations corresponding to these terms vary depending on implementation.

Example 31—Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing system to perform the method. The technologies described herein can be implemented in a variety of programming languages.

Example 32—Example Cloud Computing Environment

Figure 25:
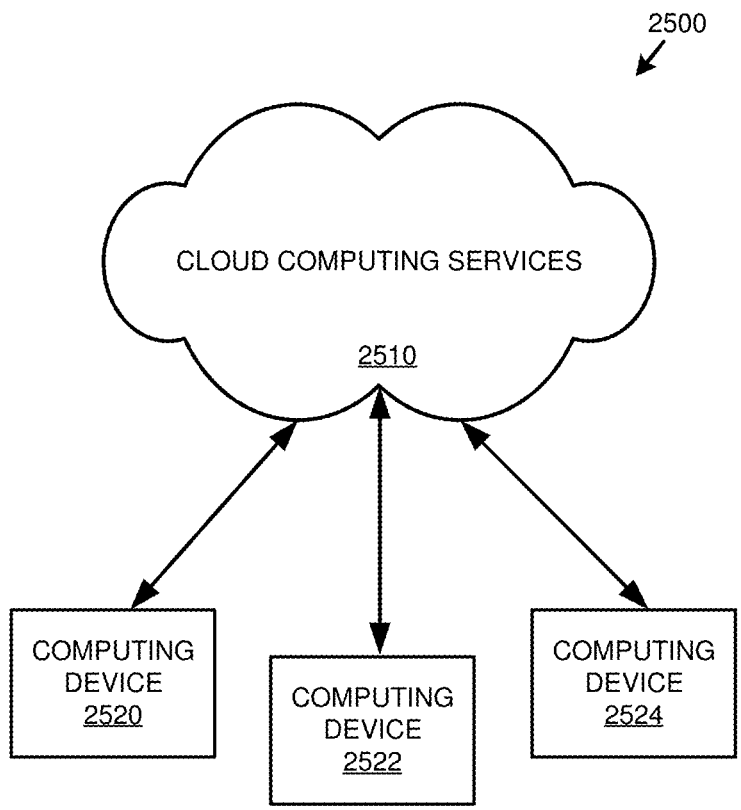
FIG. 25 is a block diagram of an example cloud computing environment that can be used in conjunction with the technologies described herein.

FIG. 25 depicts an example cloud computing environment 2500 in which the described technologies can be implemented, including, e.g., the system 100 of FIG. 1 and other systems herein. The cloud computing environment 2500 comprises cloud computing services 2510. The cloud computing services 2510 can comprise various types of cloud computing resources, such as computer servers, data storage repositories, networking resources, etc. The cloud computing services 2510 can be centrally located (e.g., provided by a data center of a business or organization) or distributed (e.g., provided by various computing resources located at different locations, such as different data centers and/or located in different cities or countries).

The cloud computing services 2510 are utilized by various types of computing devices (e.g., client computing devices), such as computing devices 2520, 2522, and 2524. For example, the computing devices (e.g., 2520, 2522, and 2524) can be computers (e.g., desktop or laptop computers), mobile devices (e.g., tablet computers or smart phones), or other types of computing devices. For example, the computing devices (e.g., 2520, 2522, and 2524) can utilize the cloud computing services 2510 to perform computing operations (e.g., data processing, data storage, and the like).

In practice, cloud-based, on-premises-based, or hybrid scenarios can be supported.

Example 33—Example Implementations

Although the operations of some of the disclosed methods are described in a particular, sequential order for convenient presentation, such manner of description encompasses rearrangement, unless a particular ordering is required by specific language set forth herein. For example, operations described sequentially can in some cases be rearranged or performed concurrently.

Example 34—Example Embodiments

Any of the following embodiments can be implemented.

Clause 1. A computer-implemented method comprising:
receiving a data missing record with a plurality of fields, wherein the data missing record is missing a value for a missing field out of the fields;
identifying a closest record to the data missing record, wherein the closest record is a member of a hierarchical cluster out of a plurality of hierarchical clusters;
determining a mean estimate for the missing field based on records in the hierarchical cluster;
determining a record similarity between the data missing record and the closest record; and
imputing a value for the missing field of the data missing record, wherein the imputing comprises adjusting an observed value for the missing field of the closest record based on the record similarity.

Clause 2. One or more non-transitory computer-readable media comprising computer-executable instructions that, when executed, cause a computing system to perform the method of Clause 1.

Clause 3. The method of Clause 1 further comprising:
completing the data missing record with the imputed value, whereby a completed record is created; and
adding the completed record to an augmented dataset.

Clause 4. The method of any one of Clauses 1 or 3 further comprising:
training a neural network using the augmented dataset.

Clause 5. The method of any one of Clauses 1 or 3-4 further comprising:
partitioning an input dataset into a data missing subset and a data complete subset; and
selecting the data missing record from the data missing subset;

wherein the hierarchical cluster comprises members of the data complete subset.

Clause 6. The method of Clause 5, further comprising:
clustering the data complete subset into a plurality of hierarchical clusters, wherein the hierarchical cluster is a given hierarchical cluster out of the hierarchical clusters.

Clause 7. The method of any one of Clauses 1 or 3-6 wherein:
determining the mean estimate for the missing field comprises determining a trimmed mean of records in a cluster for the missing field.

Clause 8. The method of any one of Clauses 1 or 3-7 wherein:
determining the record similarity comprises calculating a cosine similarity between the data missing record and the closest record.

Clause 9. The method of Clause 8 wherein:
adjusting an observed value comprises multiplying the observed value by the cosine similarity.

Clause 10. The method of any one of Clauses 8-9 wherein:
imputing the value comprises subtracting the observed value adjusted by the cosine similarity from a trimmed mean or adding the observed value adjusted by the cosine similarity to a trimmed mean.

Clause 11. The method of Clause 10 further comprising:
choosing between adding and subtracting based on the cosine similarity.

Clause 12. A computing system comprising:
one or more processors;
memory storing a dataset;
wherein the memory is configured to cause the one or more processors to perform operations comprising:
receiving a data missing record with a plurality of fields out of the dataset, wherein the data missing record is missing a value for a missing field out of the fields;
identifying, in the dataset, a closest record to the data missing record, wherein the closest record is a member of a hierarchical cluster out of a plurality of hierarchical clusters;
determining a mean estimate for the missing field based on records in the hierarchical cluster;
determining a record similarity between the data missing record and the closest record;
imputing a value for the missing field of the data missing record, wherein the imputing comprises adjusting an observed value for the missing field of the closest record based on the record similarity.

Clause 13. The computing system of Clause 12 wherein the operations further comprise:
completing the data missing record with the imputed value; and
adding the completed record to a dataset, yielding an augmented dataset.

Clause 14. The computing system of any one of Clauses 12-13 wherein the operations further comprise:
partitioning the dataset into a data missing subset and a data complete subset; and
selecting the data missing record from the data missing subset;
wherein the hierarchical cluster comprises members of the data complete subset.

Clause 15. The computing system of Clause 14 wherein the operations further comprise:
clustering the data complete subset into a plurality of hierarchical clusters, wherein the hierarchical cluster is a given hierarchical cluster out of the hierarchical clusters.

Clause 16. The computing system of any one of Clauses 12-15 wherein:
determining the record similarity comprises determining a cosine similarity between the data missing record and the closest record.

Clause 17. The computing system of Clause 16 wherein:
adjusting an observed value comprises multiplying the observed value by the cosine similarity.

Clause 18. The computing system of any one of Clauses 16-17 wherein:
imputing the value comprises subtracting the observed value adjusted by the cosine similarity from a trimmed mean or adding the observed value adjusted by the cosine similarity to a trimmed mean.

Clause 19. The computing system of Clause 18 wherein the operations further comprise:
choosing between adding and subtracting based on the cosine similarity.

Clause 20. One or more non-transitory computer-readable media comprising computer-executable instructions that, when executed, cause a computing system to perform a method comprising:
receiving a dataset with at least one data missing record;
partitioning the dataset into data missing records and data complete records;
selecting fields of the dataset for clustering;
partitioning the data complete records into a plurality of hierarchical clusters via hierarchical clustering with the selected fields;
receiving a data missing record out of the data missing records, wherein the data missing record comprises a plurality of fields and the data missing record is missing a value for a missing field out of the fields;
identifying, out of the data complete record, a closest record to the data missing record, wherein the closest record is a member of a particular hierarchical cluster of the hierarchical clusters;
determining a mean estimate for the missing field based on records in the particular hierarchical cluster;
determining a record similarity between the data missing record and the closest record;
imputing a value for the missing field of the data missing record, wherein the imputing comprises adjusting an observed value for the missing field of the closest record based on the record similarity;
adding the data missing record with the imputed value to a training dataset;
training a neural network with the training dataset; and
making a prediction with the trained neural network.

Clause 21. One or more non-transitory computer-readable media comprising computer-executable instructions that, when executed, cause a computing system to perform the method of any one of Clauses 3-11.

Example 35—Example Alternatives

The technologies from any example can be combined with the technologies described in any one or more of the other examples. In view of the many possible embodiments to which the principles of the disclosed technology can be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computer-implemented method comprising:
   receiving a data missing record with a plurality of fields, wherein the data missing record is missing a value for a missing field out of the plurality of fields;
   identifying a closest record to the data missing record, wherein the closest record is a single record of a closest hierarchical cluster of records out of a plurality of hierarchical clusters, wherein the closest hierarchical cluster of records comprises two or more records;
   determining a mean estimate for the missing field based on records in the closest hierarchical cluster of records comprising two or more records;
   determining a record similarity between the data missing record and the closest record; and
   based on the record similarity, the mean estimate, and an observed value for the missing field of the closest record, imputing an imputed value for the missing field of the data missing record, wherein the imputing comprises adjusting the observed value for the missing field of the closest record based on the record similarity.

2. One or more non-transitory computer-readable media comprising computer-executable instructions that, when executed, cause a computing system to perform the method of claim 1.

3. The method of claim 1 further comprising:
   completing the data missing record with the imputed value, whereby a completed record is created; and
   adding the completed record to an augmented dataset.

4. The method of claim 3 further comprising:
   training a neural network using the augmented dataset.

5. The method of claim 1 further comprising:
   partitioning an input dataset into a data missing subset and a data complete subset; and
   selecting the data missing record from the data missing subset;
   wherein the closest hierarchical cluster of records comprises members of the data complete subset.

6. The method of claim 5, further comprising:
   clustering the data complete subset into a plurality of hierarchical clusters of records, wherein the closest hierarchical cluster of records is a given hierarchical cluster out of the plurality of hierarchical clusters of records.

7. The method of claim 1 wherein:
   determining the mean estimate for the missing field comprises determining a trimmed mean of records in a cluster for the missing field.

8. The method of claim 1 wherein:
   determining the record similarity comprises calculating a cosine similarity between the data missing record and the closest record.

9. The method of claim 8 wherein:
   adjusting an observed value comprises multiplying the observed value by the cosine similarity.

10. The method of claim 9 wherein:
    imputing the imputed value comprises subtracting the observed value adjusted by the cosine similarity from a trimmed mean or adding the observed value adjusted by the cosine similarity to a trimmed mean.

11. The method of claim 10 further comprising:
    choosing between adding and subtracting based on the cosine similarity.

12. A computing system comprising:
    one or more processors;
    memory storing a dataset;
    wherein the memory is configured to cause the one or more processors to perform operations comprising:
    receiving a data missing record with a plurality of fields out of the dataset, wherein the data missing record is missing a value for a first field out of the plurality of fields;
    identifying, in the dataset, a closest record to the data missing record, wherein the closest record is a single record of a closest hierarchical cluster out of a plurality of hierarchical clusters, wherein the closest hierarchical cluster comprises two or more records;
    determining a mean estimate for the first field based on records in the closest hierarchical cluster comprising two or more records;
    determining a record similarity between the data missing record and the closest record; and
    based on the record similarity, the mean estimate, and an observed value for the first field of the closest record, imputing an imputed value for the first field of the data missing record, wherein the imputing comprises adjusting the observed value for the first field of the closest record based on the record similarity.

13. The computing system of claim 12 wherein the operations further comprise:
    completing the data missing record with the imputed value, whereby a completed record is created; and
    adding the completed record to a dataset, yielding an augmented dataset.

14. The computing system of claim 12 wherein the operations further comprise:
    partitioning the dataset into a data missing subset and a data complete subset; and
    selecting the data missing record from the data missing subset;
    wherein the closest hierarchical cluster comprises members of the data complete subset.

15. The computing system of claim 14 wherein the operations further comprise:
    clustering the data complete subset into a plurality of hierarchical clusters, wherein the closest hierarchical cluster is a given hierarchical cluster out of the plurality of hierarchical clusters.

16. The computing system of claim 12 wherein:
    determining the record similarity comprises determining a cosine similarity between the data missing record and the closest record.

17. The computing system of claim 16 wherein:
    adjusting an observed value comprises multiplying the observed value by the cosine similarity.

18. The computing system of claim 17 wherein:
    imputing the imputed value comprises subtracting the observed value adjusted by the cosine similarity from a trimmed mean or adding the observed value adjusted by the cosine similarity to a trimmed mean.

19. The computing system of claim 18 wherein the operations further comprise:
    choosing between adding and subtracting based on the cosine similarity.

20. One or more non-transitory computer-readable media comprising computer-executable instructions that, when executed, cause a computing system to perform a method comprising:

receiving a dataset with at least one data missing record;

partitioning the dataset into data missing records and data complete records;

selecting fields of the dataset for clustering;

partitioning the data complete records into a plurality of hierarchical clusters via hierarchical clustering with the selected fields;

receiving a data missing record out of the data missing records, wherein the data missing record comprises a plurality of fields and the data missing record is missing a value for a missing field out of the plurality of fields;

identifying, out of the data complete records, a closest record to the data missing record, wherein the closest record is a single record of a particular hierarchical cluster of the plurality of hierarchical clusters, wherein the particular hierarchical cluster comprises two or more records;

determining a mean estimate for the missing field based on records in the particular hierarchical cluster comprising two or more records;

determining a record similarity between the data missing record and the closest record;

based on the record similarity, the mean estimate, and an observed value for the missing field of the closest record, imputing an imputed value for the missing field of the data missing record, wherein the imputing comprises adjusting the observed value for the missing field of the closest record based on the record similarity;

adding the data missing record with the imputed value to a training dataset;

training a neural network with the training dataset; and making a prediction with the trained neural network.

* * * * *